US012574689B2

(12) United States Patent
Andersen et al.

(10) Patent No.: US 12,574,689 B2
(45) Date of Patent: Mar. 10, 2026

(54) HEARING DEVICE COMPRISING A NOISE REDUCTION SYSTEM

(71) Applicant: Oticon A/S, Smørum (DK)

(72) Inventors: Asger Heidemann Andersen, Smørum (DK); Jesper Jensen, Smørum (DK); Michael Syskind Pedersen, Smørum (DK); Nels Hede Rohde, Smørum (DK); Anders Brødløs Olsen, Smørum (DK); Michael Smed Kristensen, Ballerup (DK); Thomas Bentsen, Smørum (DK); Andreas Thelander Bertelsen, Smørum (DK)

(73) Assignee: Oticon A/S, Smørum (DK)

( * ) Notice: Subject to any disclaimer, the term of this patent is extended or adjusted under 35 U.S.C. 154(b) by 767 days.

(21) Appl. No.: 17/562,612

(22) Filed: Dec. 27, 2021

(65) Prior Publication Data

US 2022/0124444 A1 Apr. 21, 2022

Related U.S. Application Data

(63) Continuation-in-part of application No. 16/785,167, filed on Feb. 7, 2020, now Pat. No. 11,245,993.

(30) Foreign Application Priority Data

Feb. 8, 2019 (EP) .................................... 19156307
May 29, 2019 (EP) .................................... 19177163

(51) Int. Cl.
*H04R 25/00* (2006.01)

(52) U.S. Cl.
CPC ......... *H04R 25/507* (2013.01); *H04R 25/407* (2013.01); *H04R 2225/43* (2013.01)

(58) Field of Classification Search
CPC ........................... H04R 25/507; H04R 25/407; H04R 2225/43; H04R 1/1083
(Continued)

(56) References Cited

U.S. PATENT DOCUMENTS 6,430,528 B1 8/2002 Jourjine et al.
9,078,057 B2 * 7/2015 Yu .......................... H04R 3/005
(Continued)

FOREIGN PATENT DOCUMENTS

CN 107484080 A 12/2017
CN 105611477 B 6/2018
(Continued)

OTHER PUBLICATIONS

Tchorz et al., "SNR Estimation Based on Amplitude Modulation Analysis With Applications to Noise Suppression," IEEE Transactions on Speech and Audio Processing, vol. 11, No. 3, May 2003, pp. 184-192.
(Continued)

*Primary Examiner* — Carolyn R Edwards
*Assistant Examiner* — Friedrich Fahnert
(74) *Attorney, Agent, or Firm* — Birch, Stewart, Kolasch & Birch, LLP

(57) ABSTRACT

A hearing device, e.g. a hearing aid, is configured to be worn by a user at or in an ear or to be fully or partially implanted in the head at an ear of the user. The hearing device comprises a) an input unit for providing at least one electric input signal in a time frequency representation k, m, where k and m are frequency and time indices, respectively, and k represents a frequency channel, the at least one electric input signal being representative of sound and comprising target signal components and noise components; and b) a signal processor comprising b1) a target signal estimator for providing an estimate of the target signal; b2) a noise estimator
(Continued)

for providing an estimate of the noise; b3) a gain estimator for providing respective gain values in said time frequency representation in dependence of said target signal estimate and said noise estimate, wherein said gain estimator comprises a neural network, wherein the weights of the neural network have been trained with a plurality of training signals, and wherein the outputs of the neural network comprise real or complex valued gains, or separate real valued gains and real valued phases. The invention may e.g. be used in audio devices, such as hearing aids, headsets, mobile telephones, etc., operating in noisy acoustic environments.

16 Claims, 20 Drawing Sheets

(58) Field of Classification Search
USPC ................................................ 381/73.1, 23.1
See application file for complete search history.

(56) References Cited

U.S. PATENT DOCUMENTS

| | | | | |
|---|---|---|---|---|
| 10,805,740 | B1 * | 10/2020 | Snyder | H04R 25/407 |
| 2006/0204025 | A1 * | 9/2006 | Paludan-Muller | G10L 25/00 381/317 |
| 2010/0196861 | A1 * | 8/2010 | Lunner | H04R 25/505 434/112 |
| 2010/0303267 | A1 | 12/2010 | Pedersen et al. | |
| 2017/0295438 | A1 * | 10/2017 | De Haan | H04R 3/00 |
| 2017/0345439 | A1 * | 11/2017 | Jensen | H04R 25/505 |
| 2017/0365245 | A1 * | 12/2017 | Ku | G10K 11/17825 |
| 2019/0222943 | A1 * | 7/2019 | Andersen | G10L 21/0364 |
| 2020/0105287 | A1 * | 4/2020 | Chang | G10L 21/0208 |
| 2020/0184991 | A1 | 6/2020 | Cleve | |
| 2020/0322735 | A1 * | 10/2020 | Mosgaard | H04R 25/505 |

FOREIGN PATENT DOCUMENTS

| | | | | | |
|---|---|---|---|---|---|
| CN | 109121057 | A | * | 1/2019 | H04R 25/50 |
| EP | 2151822 | A1 | * | 2/2010 | G10L 21/0208 |
| EP | 3 101 919 | A1 | | 12/2016 | |
| EP | 3 252 766 | A1 | | 12/2017 | |
| EP | 3 514 792 | A1 | | 7/2019 | |
| WO | WO 2018/190547 | A1 | | 10/2018 | |

OTHER PUBLICATIONS

Wan et al., "Networks for Speech Enhancement," Handbook of Neural Networks for Speech Processing (First edition), Jan. 1, 1999, pp. 1-27.

Xu et al., "A Regression Approach to Speech Enhancement Based on Deep Neural Networks," IEEE/ACM Transactions on Audio, Speech and Language Processing, vol. 23, No. 1, Jan. 1, 2015, pp. 1-13.

Extended European Search Report for European Application No. 24180491.3, dated Sep. 18, 2024.

European Communication pursuant to Article 94(3) EPC for European Application No. 24 180 491.3, dated Aug. 26, 2025.

Rickard et al., "The Gini index of speech, "Proceedings of the 38th Conference on Information Science and Systems (CISS'04), Jan. 2004, 6 pages total.

Sun et al., "Multiple-target deep learning for LSTM-RNN based speech enhancement," IEEE Hands-free Speech Communication and Microphone, 2017, pp. 136-140.

* cited by examiner

HEARING DEVICE COMPRISING A NOISE REDUCTION SYSTEM

This application is a Continuation-in-Part of copending application Ser. No. 16/785,167, filed on Feb. 7, 2020, which claims priority under 35 U.S.C. § 119(a) to Application No. 19156307.1, filed in Europe on Feb. 8, 2019 and Application No. 19177163.3, filed in Europe on May 29, 2019, all of which are hereby expressly incorporated by reference into the present application.

SUMMARY

The present application relates to hearing devices, e.g. hearing aids, in particular to noise reduction in a hearing device. The present application relates to the use of machine learning or artificial intelligence methods, e.g. utilizing neural networks and e.g. supervised learning, in the task of providing improvements in reduction of noise in a noisy sound signal picked up by a hearing device, e.g. a hearing aid.

A First Hearing Device

In an aspect of the present application, a hearing device, e.g. a hearing aid, configured to be worn by a user at or in an ear or to be fully or partially implanted in the head at an ear of the user is provided. The hearing device comprises

- an input unit for providing at least one electric input signal in a time frequency representation k, m, where k and m are frequency and time indices, respectively, and k represents a frequency channel, the at least one electric input signal being representative of sound and comprising target signal components and noise components; and
- a signal processor comprising
  - a (first) SNR estimator for providing a (first) target signal-to-noise ratio estimate for said at least one electric input signal in said time frequency representation;
  - an SNR-to-gain converter for converting said (first) target signal-to-noise ratio estimate(, or a second target signal-to-noise ratio estimate derived therefrom,) to respective gain values in said time frequency representation.

The hearing device is configured to provide that said signal processor comprises a neural network, wherein the weights of the neural network have been trained with a plurality of training signals.

Thereby a hearing device, e.g. a hearing aid, improved noise reduction may be provided.

The hearing device comprises at least one SNR estimator.

The SNR estimator and/or the SNR-to-gain converter may comprise a neural network.

The hearing device may comprise at least two SNR estimators. The SNR estimator may comprise first and second SNR estimators. The first and second signal-to-noise ratio (SNR) estimators, may provide respective first and second signal-to-noise ratio (SNR) estimates. The target signal-to-noise ratio may be based on the first and second signal-to-noise ratio estimates. The first and second signal-to-noise ratio (SNR) estimators may be sequentially coupled (see e.g. FIG. 13A) or coupled in parallel with respect to the SNR-to-gain converter (or both, see e.g. FIG. 14).

In an embodiment, the hearing device comprises two or more SNR estimators.

The first and second SNR estimators may be sequentially coupled, so that the output of the first SNR estimator is used by the second SNR estimator to provide an improved SNR estimate. The target signal-to-noise ratio estimate may be equal to (or configured to influence) the improved signal SNR estimate. The output of said second SNR estimator may be used as input to the SNR-to-gain converter.

The output of said second SNR estimator may be used as input to said SNR-to-gain converter.

The outputs of the first and second SNR estimators may be used in parallel as inputs to the SNR-to-gain converter. The SNR estimates may be derived in different ways. In an embodiment, the second SNR estimate is an adaptively smoothed version of the first SNR estimate. (see e.g. US20170345439A1). The first SNR may e.g. be based on spatial properties of the input signal, or it may be based on other features such as modulation or tonality. In an embodiment, the SNR estimate is based on spatial features obtained from at least two microphone signals. In an embodiment, the first SNR estimate is estimated from modulation in the input signal (distance to noise floor). The first and second SNR may e.g. be based on different features. More than two SNR estimates can be envisioned.

The first SNR estimator (cf. e.g. SNR-EST' in the drawings) may be configured to provide the first (target) signal-to-noise ratio estimate independently in each frequency channel (i.e. e.g. NOT being implemented by a neural network).

The signal processor may comprise a second SNR estimator (an SNR 'improver') for converting the first (target) signal-to-noise ratio estimate to a second (target) signal-to-noise ratio estimate. The second SNR estimator ('SNR improver') (cf. e.g. SNR2SNR' in the drawings) may comprise the neural network, wherein the weights of the neural network have been trained with a plurality of training signals.

SNR-to-gain conversion has been a weak spot in hearing aids, partly because theoretically based ('mathematically optimal') solutions are typically not well received with respect to loudness perception (it does not sound pleasant). The present disclosure proposes to introduce learned determination of gain based on SNR, e.g. using machine learning techniques, e.g. a neural network, where gain of a given frequency band is influenced by SNR values of other frequency bands than the given frequency band. In a hearing device, e.g. a hearing aid, the computational capacity is naturally limited, and hence calculations must be carefully managed. Hence, the introduction of large neural networks (e.g. deep neural networks) with large numbers of nodes and many layers is not realistic due to size/battery capacity limitations alone. However, the computational load of SNR-to-gain conversion is relatively small (compared to other tasks of an audio processing hearing device), so the use of a neural network for this task is realistic as well as desirable.

The SNR-to-gain converter (cf. e.g. SNR2G in the drawings) may comprise the neural network, wherein the weights of the neural network have been trained with a plurality of training signals (cf. e.g. FIG. 17). The SNR estimator providing inputs to the SNR-to-gain converter may be implemented by conventional methods, e.g. NOT be implemented using an artificial neural network or other algorithms based on supervised or unsupervised learning.

The neural network implementing the SNR-to-gain converter may e.g. be a recurrent neural network. The input vector to the neural network may comprise a single frame of SNR-values at a given point in time (e.g. for K frequency bands, K being e.g. smaller than or equal to 128, e.g. smaller than or equal to 64, e.g. smaller than or equal to 24). The output vector may e.g. be a single frame of gain-values (e.g. for K frequency bands). The number of hidden layers may e.g. be smaller than or equal to 10, such as smaller than or equal to 5, smaller than or equal to 2.

The input to the neural network implementing the SNR-to-gain converter may be based on a simple ('a posteriori') SNR or other (e.g. easily determined) estimate of a target signal quality. In the present context 'an a posteriori signal to noise ratio', $SNR_{post}$, is taken to mean a ratio between the observed (available) noisy signal (target signal S plus noise N, Y(t)=S(t)+N(t)), e.g. a picked up by one or more microphones, such as the power of the noisy signal, and the noise N(t), such as an estimate ($\hat{N}(t)$) of the noise, such as the power of the noise signal, at a given point in time t, i.e. $SNR_{post}(t)=Y(t)/\hat{N}(t)$, or $SNR_{post}(t)=Y(t)^2/\hat{N}(t)^2$. The 'a posteriori signal to noise ratio', $SNR_{post}$, may e.g. be defined in the time-frequency domain as a value for each frequency band (index k) and time frame (index m), i.e. $SNR_{post}=SNR_{post}(k,m$, i.e. e.g. $SNR_{post}(k,m)=|Y(k,m)|^2/|\hat{N}(k,m)|^2$.

In an more general aspect, the SNR-to-gain converter may implement a non-linear function G(k,m), k=1, . . . , K, where G is gain, and wherein gain G(k,m) in the $k^{th}$ frequency-channel depends on said (e.g. first or second) target signal-to-noise ratio estimates of one or more further, such as all K, frequency-channels at time index m, and optionally on previous values of said estimates, and wherein said non-linear function is implemented by said neural network. The G(k,m) in the $k^{th}$ frequency-channel may thus depend on previous values G(k,m−1), G(k, m−2), . . . , G(k, m−Np), where Np is number of previous values, and correspondingly also of historic values of one or more of the neighboring frequency channels, k+1, k−1, e.g. all frequency channels k=1, . . . , K. The nonlinear function may e.g. be implemented as a neural network, or using any other method of the field of machine learning or artificial intelligence.

The neural network may be optimized towards only partly attenuating the noise component of the noisy input signal(s). The signal neural network may be optimized in a training procedure wherein the target signal used in the training may contain noise, which has been attenuated by e.g. 10 dB or 15 dB or 20 dB. Hereby, as the gain variations become smaller, a smaller neural network may be utilized. The is advantageous in a limited power capacity device as a portable hearing device, e.g. a hearing aid, where power consumption is a primary design parameter.

The SNR estimator and/or the SNR-to-gain estimator may be configured to receive additional inputs from over or more sensors or detectors. The one or more sensor or detectors may provide one or more of

- a (single or multichannel) voice activity flag,
- a (single or multichannel) own voice activity flag,
- a different SNR estimate,
- an onset flag
- estimated Direction of Arrival (DoA) information,
- a camera based input capturing lip-reading or throat movement information.

A different SNR estimate may be based on signal modulation (e.g. from a single microphone), or spatial properties utilizing at least two microphone signals, or binaural SNR estimates.

The onset flag may e.g. be provided by an onset or transient detector derived directly from a time domain input signal. The purpose of the time domain transient detector is to circumvent the time delay in the analysis filter bank, thus getting a small look into the future as seen from the perspective of processing taking place after the analysis filter bank The level of noise is an important driver for applying noise reduction. The SNR-to-gain estimator may be configured to provide a maximum amount of noise reduction. The hearing device (e.g. the SNR-to-gain estimator) may be configured to provide that the maximum amount of noise reduction is dependent on the type and level of noise.

The hearing device may be constituted by or comprise a hearing aid, a headset, an earphone, an ear protection device or a combination thereof.

A Second Hearing Device

In a second aspect, a hearing device, e.g. a hearing aid, configured to be worn by a user at or in an ear or to be fully or partially implanted in the head at an ear of the user is provided by the present disclosure. The hearing aid comprises

- an input unit for providing at least one electric input signal in a time frequency representation k, m, where k and m are frequency and time indices, respectively, and k represents a frequency channel, the at least one electric input signal being representative of sound and comprising target signal components and noise components; and
- a signal processor comprising
  - a target signal estimator for providing an estimate of the target signal in said time frequency representation;
  - a noise estimator for providing an estimate of the noise in said time frequency representation;
  - a gain estimator for providing respective gain values in said time frequency representation in dependence of said target signal estimate and said noise estimate, wherein said gain estimator comprises a neural network, wherein the weights of the neural network have been trained with a plurality of training signals, and wherein the outputs of the neural network comprise real or complex valued gains, or separate real valued gains and real valued phases.

The hearing aid may comprise an analysis filter bank for providing the at least one electric input signal in a time frequency representation. The hearing aid may comprise a synthesis filter bank for converting a processed version of the least one electric input signal from a time frequency representation to a time-domain representation. The analysis filter bank output may be represented by complex or real values or by magnitude and phase.

The hearing aid may be configured to provide that magnitudes, or squared magnitudes, or a logarithm of the magnitudes of the target and the noise estimates are used as input to the neural network (gain estimator).

One advantage of using separate target and noise estimates as inputs rather than the ratio between the target and the noise (SNR) is that the input level of the target and the noise components are maintained.

As an alternative to having separate target and noise inputs to the neural network, the provided input may consist of a signal to noise ratio and an input level estimate (of the noisy signal).

The target and noise estimates may be based on a single microphone providing the at least one electric input signal.

The target and noise estimates may be based on a multitude of microphones providing the at least one electric input signal as a multitude of electric input signals. The target and noise estimates may be obtained from linear combinations of the multitude of electric input signals.

The target and noise estimates may be obtained, from a) a target-enhancing beamformer and b) a target cancelling beamformer having a minimum sensitivity direction pointing approximately towards the target source or sources, said beamformers being provided by the linear combinations of the multitude of electric input signals. The target cancelling beamformer or beamformers may exhibit a minimum sensitivity direction pointing approximately towards the target direction or directions (the latter being relevant in case more than one target sound source is present in the environment at a given point in time).

The target-enhancing and/or the target cancelling beamformers may be fixed or adaptive.

The hearing aid may comprise a plurality of target cancelling beamformers simultaneously providing the noise estimate to the input features to the gain estimator (the neural network), each of the plurality of target cancelling beamformers having a single minimum sensitivity direction pointing towards a different target source.

The noise estimate used for SNR estimation may as well be based on a combination of different target cancelling beamformers. May be relevant for a hearing device according to the first as well as the second aspect (first and second hearing device as headlined above).

The hearing aid may be configured to provide that the maximum amount of noise reduction provided by the neural network is controlled by level, or modulation (e.g. SNR), or a degree of sparsity of the inputs to the neural network. A degree of sparsity may e.g. be represented by a degree of overlap in time and/or frequency of background noise with (target) speech.

It is intended that the features described in connection with a given one of the first and second hearing devices can be used with the other (when meaningful).

Other Features of the First and Second Hearing Devices

The hearing device may be adapted to provide a frequency dependent gain and/or a level dependent compression and/or a transposition (with or without frequency compression) of one or more frequency ranges to one or more other frequency ranges, e.g. to compensate for a hearing impairment of a user in an embodiment, the hearing device comprises a signal processor for enhancing the input signals and providing a processed output signal.

In an embodiment, the hearing device comprises an output unit for providing a stimulus perceived by the user as an acoustic signal based on a processed electric signal. In an embodiment, the output unit comprises a number of electrodes of a cochlear implant (for a CI type hearing device) or a vibrator of a bone conducting hearing device. In an embodiment, the output unit comprises an output transducer. In an embodiment, the output transducer comprises a receiver (loudspeaker) for providing the stimulus as an acoustic signal to the user (e.g. in an acoustic (air conduction based) hearing device). In an embodiment, the output transducer comprises a vibrator for providing the stimulus as mechanical vibration of a skull bone to the user (e.g. in a bone-attached or bone-anchored hearing device).

The hearing device may comprise an input unit for providing an electric input signal representing sound. In an embodiment, the input unit comprises an input transducer, e.g. a microphone, for converting an input sound to an electric input signal. In an embodiment, the input unit comprises a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

In an embodiment, the hearing device comprises a directional microphone system adapted to spatially filter sounds from the environment, and thereby enhance a target acoustic source among a multitude of acoustic sources in the local environment of the user wearing the hearing device. In an embodiment, the directional system is adapted to detect (such as adaptively detect) from which direction a particular part of the microphone signal originates. This can be achieved in various different ways as e.g. described in the prior art. In hearing devices, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing device may comprise antenna and transceiver circuitry (e.g. a wireless receiver) for wirelessly receiving a direct electric input signal from another device, e.g. from an entertainment device (e.g. a TV-set), a communication device, a wireless microphone, or another hearing device. In an embodiment, the direct electric input signal represents or comprises an audio signal and/or a control signal and/or an information signal. In an embodiment, the hearing device comprises demodulation circuitry for demodulating the received direct electric input to provide the direct electric input signal representing an audio signal and/or a control signal e.g. for setting an operational parameter (e.g. volume) and/or a processing parameter of the hearing device. In general, a wireless link established by antenna and transceiver circuitry of the hearing device can be of any type. In an embodiment, the wireless link is established between two devices, e.g. between an entertainment device (e.g. a TV) and the hearing device, or between two hearing devices, e.g. via a third, intermediate device (e.g. a processing device, such as a remote control device, a smartphone, etc.). In an embodiment, the wireless link is used under power constraints, e.g. in that the hearing device is or comprises a portable (typically battery driven) device. In an embodiment, the wireless link is a link based on near-field communication, e.g. an inductive link based on an inductive coupling between antenna coils of transmitter and receiver parts. In another embodiment, the wireless link is based on far-field, electromagnetic radiation. In an embodiment, the communication via the wireless link is arranged according to a specific modulation scheme, e.g. an analogue modulation scheme, such as FM (frequency modulation) or AM (amplitude modulation) or PM (phase modulation), or a digital modulation scheme, such as ASK (amplitude shift keying), e.g. On-Off keying, FSK (frequency shift keying), PSK (phase shift keying), e.g. MSK (minimum shift keying), or QAM (quadrature amplitude modulation), etc.

In an embodiment, the communication between the hearing device and the other device is in the base band (audio frequency range, e.g. between 0 and 20 kHz). Preferably, communication between the hearing device and the other device is based on some sort of modulation at frequencies above 100 kHz. Preferably, frequencies used to establish a communication link between the hearing device and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). In an embodiment, the wireless link is based on a standardized or proprietary technology. In an embodiment, the wireless link is based on Bluetooth technology (e.g. Bluetooth Low-Energy technology).

In an embodiment, the hearing device has a maximum outer dimension of the order of 0.15 m (e.g. a handheld mobile telephone). In an embodiment, the hearing device has a maximum outer dimension of the order of 0.08 m (e.g. a head set). In an embodiment, the hearing device has a maximum outer dimension of the order of 0.04 m (e.g. a hearing instrument).

In an embodiment, the hearing device is a portable (i.e. configured to be wearable) device, e.g. a device comprising a local energy source, e.g. a battery, e.g. a rechargeable battery. The heating device is e.g. a low weight, easily wearable, device, e.g. having a total weight less than 100 g (or less than 10 g).

The hearing device may comprise a forward or signal path between an input unit (e.g. an input transducer, such as a microphone or a microphone system and/or direct electric input (e.g. a wireless receiver)) and an output unit, e.g. an output transducer. In an embodiment, the signal processor is located in the forward path. In an embodiment, the signal processor is adapted to provide a frequency dependent gain according to a user's particular needs. In an embodiment, the hearing device comprises an analysis path comprising functional components for analyzing the input signal (e.g. determining a level, a modulation, a type of signal, an acoustic feedback estimate, etc.). In an embodiment, some or all signal processing of the analysis path and/or the signal path is conducted in the frequency domain. In an embodiment, some or all signal processing of the analysis path and/or the signal path is conducted in the time domain.

In an embodiment, an analogue electric signal representing an acoustic signal is converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 μs, for $f_s$=20 kHz. In an embodiment, a number of audio samples are arranged in a time frame. In an embodiment, a time frame comprises 64 or 128 audio data samples. Other frame lengths may be used depending on the practical application.

The hearing device may comprise an analogue-to-digital (AD) converter to digitize an analogue input (e.g. from an input transducer, such as a microphone) with a predefined sampling rate, e.g. 20 kHz. In an embodiment, the hearing devices comprise a digital-to-analogue (DA) converter to convert a digital signal to an analogue output signal, e.g. for being presented to a user via an output transducer.

In an embodiment, the hearing device, e.g. the input unit, and or the antenna and transceiver circuitry comprise(s) a TF-conversion unit for providing a time-frequency representation of an input signal. In an embodiment, the time-frequency representation comprises an array or map of corresponding complex or real values of the signal in question in a particular time and frequency range. In an embodiment, the TF conversion unit comprises a filter bank for filtering a (time varying) input signal and providing a number of (time varying) output signals each comprising a distinct frequency range of the input signal. In an embodiment, the TF conversion unit comprises a Fourier transformation unit for converting a time variant input signal to a (time variant) signal in the (time-)frequency domain. In an embodiment, the frequency range considered by the hearing device from a minimum frequency $f_{min}$ to a maximum frequency $f_{max}$ comprises a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. In an embodiment, a signal of the forward and/or analysis path of the hearing device is split into a number NI of frequency bands (e.g. of uniform width), where NI is e.g. larger than 5, such as larger than 10, such as larger than 50, such as larger than 100, such as larger than 500, at least some of which are processed individually. In an embodiment, the hearing device is/are adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing device may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing device is reduced (e.g. to save power), e.g. to disable wireless communication, and/or to disable specific features of the hearing device.

The hearing device may comprise a number of detectors configured to provide status signals relating to a current physical environment of the hearing device (e.g. the current acoustic environment), and/or to a current state of the user wearing the hearing device, and/or to a current state or mode of operation of the hearing device. Alternatively or additionally, one or more detectors may form part of an external device in communication (e.g. wirelessly) with the hearing device. An external device may e.g. comprise another hearing device, a remote control, and audio delivery device, a telephone (e.g. a smartphone), an external sensor, etc.

In an embodiment, one or more of the number of detectors operate(s) on the full band signal (time domain). In an embodiment, one or more of the number of detectors operate (s) on band split signals ((time-) frequency domain), e.g. in a limited number of frequency bands.

In an embodiment, the number of detectors comprises a level detector for estimating a current level of a signal of the forward path. In an embodiment, the predefined criterion comprises whether the current level of a signal of the forward path is above or below a given (L-)threshold value. In an embodiment, the level detector operates on the full band signal (time domain). In an embodiment, the level detector operates on hand split signals ((time-) frequency domain).

In a particular embodiment, the hearing device comprises a voice detector (VD) for estimating whether or not (or with what probability) an input signal comprises a voice signal (at a given point in time). A voice signal is in the present context taken to include a speech signal from a human being. It may also include other forms of utterances generated by the human speech system (e.g. singing). In an embodiment, the voice detector unit is adapted to classify a current acoustic environment of the user as a VOICE or NO-VOICE environment. This has the advantage that time segments of the electric microphone signal comprising human utterances (e.g. speed)) in the user's environment can be identified, and thus separated from time segments only (or mainly) comprising other sound sources (e.g. artificially generated noise). In an embodiment, the voice detector is adapted to detect as a VOICE also the user's own voice. Alternatively, the voice detector is adapted to exclude a user's own voice from the detection of a VOICE.

In an embodiment, the hearing device comprises an own voice detector for estimating whether or not (or with what probability) a given input sound (e.g. a voice, e.g. speech) originates from the voice of the user of the system. In an embodiment, a microphone system of the hearing device is adapted to be able to differentiate between a user's own voice and another person's voice and possibly from NON-voice sounds.

In an embodiment, the number of detectors comprises a movement detector, e.g. an acceleration sensor. In an embodiment, the movement detector is configured to detect movement of the user's facial muscles and/or bones, e.g. due to speech or chewing (e.g. jaw movement) and to provide a detector signal indicative thereof.

The hearing device may comprise a classification unit configured to classify the current situation based on input signals from (at least some of) the detectors, and possibly other inputs as well. In the present context 'a current situation' is taken to be defined by one or more of a) the physical environment (e.g. including the current electromagnetic environment, e.g. the occurrence of electromagnetic signals (e.g. comprising audio and/or control signals) intended or not intended for reception by the hearing device, or other properties of the current environment than acoustic);
b) the current acoustic situation (input level, feedback, etc.), and
c) the current mode or state of the user (movement, temperature, cognitive load, etc.);
d) the current mode or state of the hearing device (program selected, time elapsed since last user interaction, etc.) and/or of another device in communication with the hearing device.

In an embodiment, the hearing device further comprises other relevant functionality for the application in question, e.g. compression, feedback control, etc.

In an embodiment, the hearing device comprises a listening device, e.g. a hearing aid, e.g. a hearing instrument, e.g. a hearing instrument adapted for being located at the ear or fully or partially in the ear canal of a user, e.g. a headset, an earphone, an ear protection device or a combination thereof. In an embodiment, the hearing assistance system comprises a speakerphone (comprising a number of input transducers and a number of output transducers, e.g. for use in an audio conference situation), e.g. comprising a beamformer filtering unit, e.g. providing multiple beamforming capabilities.

A Further Hearing Device

In an aspect of the present disclosure, a hearing device is configured to provide that a maximum amount of noise reduction may depend on the type of noise (see e.g. FIG. 16B, 16C). As the artefacts (e.g. resulting from noise reduction) may be different depending on the noise type, the maximum amount of attenuation may depend on (e.g. be adjusted according to) the type of background noise, such as depending on the amount of modulation. If, for example, the background noise is modulated, a higher amount of attenuation may be tolerated compared to an unmodulated background. The maximum attenuation allowed by the system may be frequency dependent (or, alternatively, uniform over frequencies). The hearing device may be a hearing device as described above, in the detailed description of embodiments or in the claims, or it may be any other hearing device, e.g. a hearing aid, comprising a configurable noise reduction system.

A Still Further Hearing Device

In an aspect of the present disclosure, a hearing device, e.g. a hearing aid, configured to be worn by a user at or in an ear or to be fully or partially implanted in the head at an ear of the user is provided by the present disclosure. The hearing device may comprise:

- an input unit for providing at least one electric input signal in a time frequency representation k, m, where k and m are frequency and time indices, respectively, and k represents a frequency channel, the at least one electric input signal being representative of sound and comprising target signal components and noise components; and
- a signal processor comprising
  - an SNR estimator for providing a target signal-to-noise ratio (SNR) estimate for said at least one electric input signal in said time frequency representation
  - an SNR-to-gain converter for converting said target signal-to-noise ratio estimates to respective gain values in said time frequency representation, wherein said SNR-to-gain converter comprises a recurrent neural network, wherein the weights of the neural network have been trained with a plurality of training signals.

The SNR to gain converter may be configured to implement a noise reduction algorithm.

The hearing device may comprise a combination unit and wherein said gain values are applied to said at least one electric input signal to provide a processed signal representative of said sound for further processing or presentation to the user as stimuli perceivable as sound.

The hearing device may be configured to provide said time frequency representation of the at least one electric input signal comprises magnitude information as well as phase information.

The hearing device may be configured to provide that the inputs to said SNR-to-gain converter comprises magnitude information as well as phase information.

The hearing device may be configured to provide that the inputs to said SNR-to-gain converter comprises changes in phase information over time. Such charge over time of phase information is representative of the location of frequency content in a given frequency band and my be used by the neural network (of the SNR-to-gain converter) to locate where in a given frequency sub-band energy is located. Thereby the neural network may allow to process noise components with a larger resolution than the width of the frequency sub-band would normally allow (using only magnitude information as inputs). Thereby a relatively low latency of the filter bank (based on a relatively large bandwidth of the frequency sub-bands) can be implemented without compromising the noise reduction (still allowing an acceptable frequency resolution in noise reduction).

The hearing device may be configured to provide that the outputs of said SNR-to-gain converter comprises magnitude information as well as phase information.

Use

In an aspect, use of a hearing device as described above, in the 'detailed description of embodiments' and in the claims, is moreover provided. In an embodiment, use is provided in a system comprising audio distribution. In an embodiment, use is provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Method

In an aspect, a method of operating a hearing device, e.g. a hearing aid, configured to be worn by a user at or in an ear or to be fully or partially implanted in the head at an ear of the user, is provided. The method comprises

- providing at least one electric input signal in a time frequency representation k, in, where k and in are frequency and time indices, respectively, and k represents a frequency channel, the at least one electric input signal being representative of sound and comprising target signal components and noise components; and
- providing a (first) target signal-to-noise ratio estimate for said at least one electric input signal in said time frequency representation;
- converting said (first) target signal-to-noise ratio estimate (or a second target signal-to-noise ratio estimate derived therefrom) to respective gain values in said time frequency representation is furthermore provided by the present application; and
- providing said (first) target signal-to-noise ratio estimate, (and/or said second target signal-to-noise ratio estimate,) and/or said respective gain values using a neural network, wherein the weights of the neural network have been trained with a plurality of training signals.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

A Computer Readable Medium

In an aspect, a tangible computer-readable medium storing a computer program comprising program code means for causing a data processing system to perform at least some (such as a majority or all) of the steps of the method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program

A computer program (product) comprising instructions which, when the program is executed by a computer, cause the computer to carry out (steps of) the method described above, in the 'detailed description of embodiments' and in the claims is furthermore provided by the present application A Data Processing System In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System

In a further aspect, a hearing system comprising a hearing device as described above, in the 'detailed description of embodiments', and in the claims, AND an auxiliary device is moreover provided.

In an embodiment, the hearing system is adapted to establish a communication link between the hearing device and the auxiliary device to provide that information (e.g. control and status signals, possibly audio signals) can be exchanged or forwarded from one to the other.

In an embodiment, the hearing system comprises an auxiliary device, e.g. a remote control, a smartphone, or other portable or wearable electronic device, such as a smartwatch or the like.

In an embodiment, the auxiliary device is or comprises a remote control for controlling functionality and operation of the hearing device(s). In an embodiment, the function of a remote control is implemented in a smartphone, the smartphone possibly running an APP allowing to control the functionality of the audio processing device via the smartphone (the hearing device(s) comprising an appropriate wireless interface to the smartphone, e.g. based on Bluetooth or some other standardized or proprietary scheme).

In an embodiment, the auxiliary device is or comprises an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing device.

In an embodiment, the auxiliary device is or comprises another hearing device. In an embodiment, the hearing system comprises two hearing devices adapted to implement a binaural hearing system, e.g. a binaural hearing aid system.

A Binaural Hearing System

A binaural hearing system, e.g. a binaural hearing aid system, comprising first and second hearing devices, e.g. hearing aids, as descried above, in the detailed description of embodiments, or in the claims is furthermore provided by the present disclosure. The first and second hearing devices may be adapted to establish a wireless link between them and to exchange data between them. The data may include the target SNR-estimates (e.g. first and second (dependent or independent) SNR estimates). The SNR-to-gain estimator of the first and second hearing devices may be configured to include the target SNR estimates (e.g. respective first and second SNR estimates) of the respective opposite hearing device in the estimation of respective first and second gain values in a time frequency representation.

An APP

In a further aspect, a non-transitory application, termed an APP, is furthermore provided by the present disclosure. The APP comprises executable instructions configured to be executed on an auxiliary device to implement a user interface for a hearing device or a hearing system described above in the 'detailed description of embodiments', and in the claims. In an embodiment, the APP is configured to run on cellular phone, e.g. a smartphone, or on another portable device allowing communication with said hearing device or said hearing system.

Definitions

In the present context, a 'hearing device' refers to a device, such as a hearing aid, e.g. a hearing instrument, or an active ear-protection device, or other audio processing device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. A 'hearing device' further refers to a device such as an earphone or a headset adapted to receive audio signals electronically, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone stricture of the user's head and/or through parts of the middle ear as well as electric signals transferred directly or indirectly to the cochlear nerve of the user.

The hearing device may be configured to be worn in any known way, e.g. as a unit arranged behind the ear with a tube leading radiated acoustic signals into the ear canal or with an output transducer, e.g. a loudspeaker, arranged close to or in the ear canal, as a unit entirely or partly arranged in the pinna and/or in the ear canal, as a unit, e.g. a vibrator, attached to a fixture implanted into the skull bone, as an attachable, or entirely or partly implanted, unit, etc. The hearing device may comprise a single unit or several units communicating electronically with each other. The loudspeaker may be arranged in a housing together with other components of the hearing device, or may be an external unit in itself (possibly in combination with a flexible guiding element, e.g. a dome-like element).

More generally, a hearing device comprises an input transducer for receiving an acoustic signal from a user's surroundings and providing a corresponding input audio signal and/or a receiver for electronically (i.e. wired or wirelessly) receiving an input audio signal, a (typically configurable) signal processing circuit (e.g. a signal processor, e.g. comprising a configurable (programmable) processor, e.g. a digital signal processor) for processing the input audio signal and an output unit for providing an audible signal to the user in dependence on the processed audio signal. The signal processor may be adapted to process the input signal in the time domain or in a number of frequency bands. In some hearing devices, an amplifier and/or compressor may constitute the signal processing circuit. The signal processing circuit typically comprises one or more (integrated or separate) memory elements for executing programs and/or for storing parameters used (or potentially used) in the processing and/or for storing information relevant for the function of the hearing device and/or for storing information (e.g. processed information, e.g. provided by the signal processing circuit), e.g. for use in connection with an interface to a user and/or an interface to a programming device. In some hearing devices, the output unit may comprise an output transducer, such as e.g. a loudspeaker for providing an air-borne acoustic signal or a vibrator for providing a structure-borne or liquid-borne acoustic signal. In some hearing devices, the output unit may comprise one or more output electrodes for providing electric signals (e.g. a multi-electrode array for electrically stimulating the cochlear nerve). In an embodiment, the hearing device comprises a speakerphone (comprising a number of input transducers and a number of output transducers, e.g. for use in an audio conference situation).

In some hearing devices, the vibrator may be adapted to provide a structure-borne acoustic signal transcutaneously or percutaneously to the skull bone. In some hearing devices, the vibrator may be implanted in the middle ear and/or in the inner ear. In some hearing devices, the vibrator may be adapted to provide a structure-borne acoustic signal to a middle-ear bone and/or to the cochlea. In some hearing devices, the vibrator may be adapted to provide a liquid-borne acoustic signal to the cochlear liquid, e.g. through the oval window. In some hearing devices, the output electrodes may be implanted in the cochlea or on the inside of the skull bone and may be adapted to provide the electric signals to the hair cells of the cochlea, to one or more hearing nerves, to the auditory brainstem, to the auditory midbrain, to the auditory cortex and/or to other parts of the cerebral cortex.

A hearing device, e.g. a hearing aid, may be adapted to a particular user's needs, e.g. a hearing impairment. A configurable signal processing circuit of the hearing device may be adapted to apply a frequency and level dependent compressive amplification of an input signal. A customized frequency and level dependent gain (amplification or compression) may be determined in a fitting process by a fitting system based on a user's hearing data, e.g. an audiogram, using a fitting rationale (e.g. adapted to speech). The frequency and level dependent gain may e.g. be embodied in processing parameters, e.g. uploaded to the hearing device via an interface to a programming device (fitting system), and used by a processing algorithm executed by the configurable signal processing circuit of the hearing device.

A 'hearing system' refers to a system comprising one or two hearing devices, and a 'binaural hearing system' refers to a system comprising two hearing devices and being adapted to cooperatively provide audible signals to both of the user's ears. Hearing systems or binaural hearing systems may further comprise one or more 'auxiliary devices', which communicate with the hearing device(s) and affect and/or benefit from the function of the hearing device(s).

Auxiliary devices may be e.g. remote controls, audio gateway devices, mobile phones (e.g. smartphones), or music players. Hearing devices, hearing systems or binaural hearing systems may e.g. be used for compensating for a hearing-impaired person's loss of hearing capability, augmenting or protecting a normal-hearing person's hearing capability and/or conveying electronic audio signals to a person. Hearing devices or hearing systems may e.g. form part of or interact with public-address systems, active ear protection systems, handsfree telephone systems, car audio systems, entertainment (e.g. karaoke) systems, teleconferencing systems, classroom amplification systems, etc.

Embodiments of the disclosure may e.g. be useful in applications such as audio devices, such as hearing aids, headsets, mobile telephones, etc., typically operating in an acoustic environment comprising noisy signals, where a target signal should be improved to enhance a user's perception of the target signal.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing devices, e.g. hearing aids. Today's hearing instrument processing such as noise reduction is often applied in different frequency channels.

Figure 1:
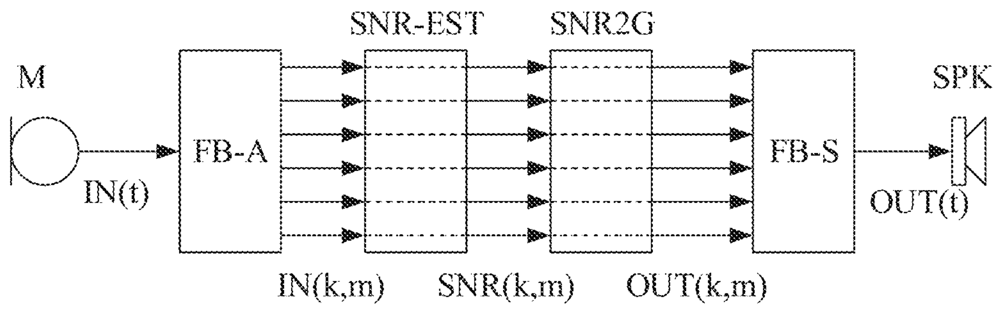
FIG. 1 schematically shows a typical hearing instrument noise reduction system, FIG. 2 schematically illustrates the use of information across different frequency channels to improve the noise reduction system by letting the gain estimate for the $k^{th}$ frequency channel not only depend on the SNR in the $k^{th}$ channel, but on the SNR estimate of a number of neighbouring, such as on all, frequency channels, FIG. 3 schematically shows estimated SNR values across frequency mapped to a vector of gain values across frequency using a neural network (NN) in a hearing device according to the present disclosure.

Hereby it is possible to take advantage of the fact that different audio signals are less overlapping when represented in time and frequency compared to a representation solely in the time domain. FIG. 1 illustrates a typical noise reduction algorithm in a hearing instrument. In each frequency channel k, a signal-to-noise ratio (SNR(k)) is estimated. The SNR may be estimated based on a single microphone or based on multiple microphones, allowing spatial information to be taken into account. In each frequency channel, the estimated signal-to-noise ratio is converted into a gain via a non-linear function:

$$G(k) = f(SNR(k)).$$

Typically, the gain function attenuates the sound, when the SNR estimate is low, while the sound is unaltered G(k)=1 (0 dB) when the SNR estimate is high.

The gain is (together with other gain contributions) applied to the audio signal before the signal is synthesized back into a time domain signal.

Figure 2:
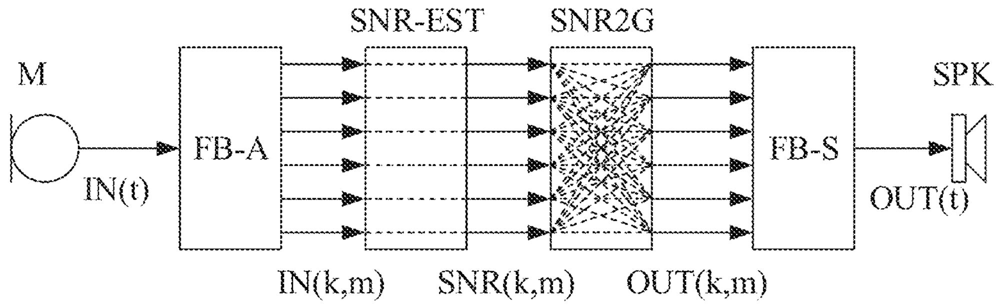
Figure 3:
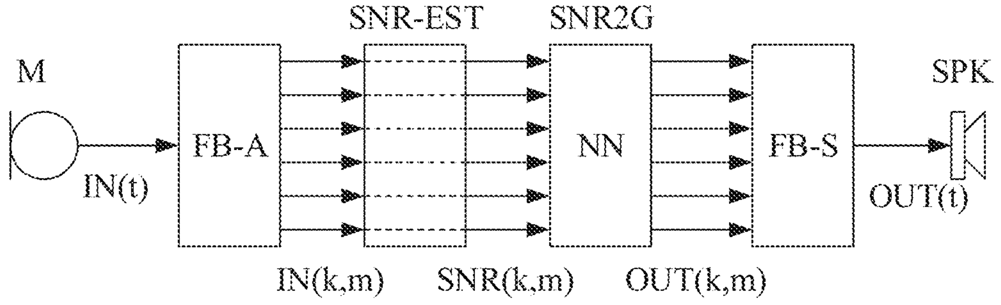

The block diagrams of FIG. 1-3 are schematic and should be interpreted to include an implementation where the frequency dependent gains ((G(k,m)) provided by the SNR-to-gain estimator (SNR2G) are applied (e.g. via respective combination units) to the input signals IN(k,m) from the analysis filter bank (FB-A) to provide output signals OUT (k,m) that are fed to the synthesis filter bank (FB-S). Such structural solution is provided in FIG. 7, 12, 13B. The same is relevant for the embodiments of FIG. 6, 8, 11, 13A, 14, 16A, 16B, 16C. Likewise, more functional units may be included in the various embodiments, e.g. beamforming (as e.g. shown in FIG. 11), compression, frequency transposition, feedback control, etc.

FIG. 1 shows a typical hearing instrument noise reduction system. The audio signal(s) recorded at the microphone(s) are by use of an analysis filler bank converted into different frequency channels, each representing a range of frequencies. In each frequency channel, the signal is analyzed in order to estimate the current signal-to-noise ratio (SNR) at a given time and frequency unit. Each SNR is mapped into a gain, were a low SNR is attenuated (noise is assumed to be dominant) and a high SNR is kept unaltered (assuming that the signal of interest is dominant). After a gain has been applied in each frequency channel, the signals are converted back into an enhanced audio signal in the time domain.

Audio signals such as speech contains components (such as harmonic frequencies or onsets), which are highly correlated across different frequency channels. When processing is applied in separate frequency channels, information across frequency is not fully utilized. Hereby the hearing instrument does not take advantage of some information which could be used to improve the noise reduction.

FIG. 2 shows the use of information across different frequency channels to improve the noise reduction system by letting the gain estimate for the kth frequency channel not only depend on the SNR in the kth channel, but on the SNR estimate of a number of neighbouring, such as on all, frequency channels.

A schematic drawing of the proposed solution is shown in FIG. 2. Contrary to FIG. 1, where the gain in the $k^{th}$ channel only depends on the estimated SNR in the $k^{th}$ channel, the gain in the $k^{th}$ channel may depend on the estimated SNR values of all K channels, i.e.

$$G(k) = f(SNR(1), \ldots , SNR(k), \ldots , SNR(K)).$$

It is challenging to manually find and tune the optimal way of combining the different SNR estimates across frequencies into a gain. For that reason, we propose to apply a neural network (NN) which has been optimized to find the best mapping from a set of SNR estimates across frequency to a set of frequency dependent gain values. This is shown in FIG. 3.

FIG. 3 shows estimated SNR values across frequency mapped to a vector of gain values across frequency using a neural network (NN) in a hearing device according to the present disclosure.

Figure 4:
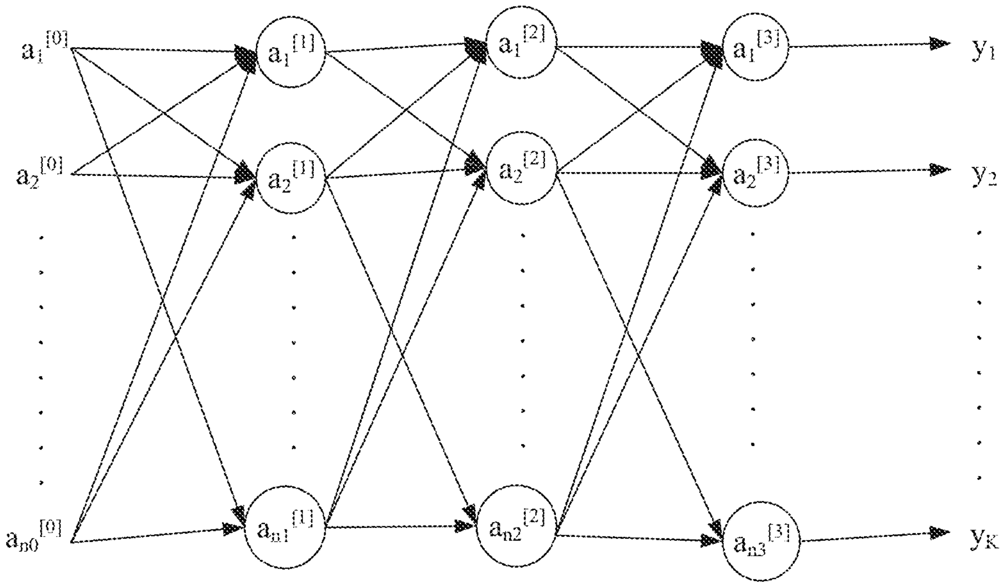
FIG. 4 shows an exemplary structure of a (feed-forward) neural network with M=3 layers.

The neural network may be trained on examples of estimated signal-to-noise ratios as input obtained from a noisy input mixture and its corresponding output as a vector across frequency of a noise-reduced input signal mainly containing the desired signal. An example of a feed-forward neural network with M=3 is given in FIG. 4. The input signal is passed through a number of nonlinear layers of type $a^{[1]}=f(Wa^{[1-1]}+b)$. The $n^{th}$ node of the $1^{th}$ layer $a_n^{[l]}$ depends on all the nodes of the previous layer, i.e. $a_n^{[l]}=f(\Sigma_{m=1}^{n^{[l-1]}} W_{nm}^{[l]}a_m^{[l-1]}+b_n^{[l]}$ where $W_{nm}^{[l]}$ and $b_n^{[l]}$ are trained weights and $f$ is a non-linear function. When the neural network contains more than one hidden layer it is termed a deep neural network (DNN). The weights of a neural network are typically trained using backpropagation, were the weighs are updated in order to minimize some given cost function. E.g. the weights of the neural network W, b may be optimized such that the difference across all frequency channels between the desired output y(k) (known in advance, when training) and the estimated output $\hat{y}(k)=G(k)x(k)$, where x(k) is the noisy audio signal in the $k^{th}$ frequency channel. The noisy audio signal x(k) may be a pre-processed signal such as the output of a beamformer. The cost function may be expressed as a distance measure e.g. in the linear domain or in the logarithmic domain. In noise reduction it is not always desirable to remove all noise, as the listener would like to be aware of the environment. The network may be optimized towards only partly attenuating the noise component of the mixture, i.e. the target signal used in training may contain noise, which has been attenuated by e.g. 10 dB or 15 dB or 20 dB. Hereby, as the gain variations become smaller, a smaller neural network may be utilized.

The feed-forward neural network is just used as an example. Also other types of network structures may be applied, e.g. convolutional neural network (CNN) or a recurrent neural networks such as a long short-term memory (LSTM) neural network. Other machine learning techniques may as well be applied. The neural network may be fully-connected, i.e. all nodes are connected to each other. Alternatively, the network may be sparse, e.g. each node may only be connected to an adjacent frequency channel, the nearest frequency channels or the k nearest frequency channels resulting in a diagonal-like structure of W (e.g. a "(fat) diagonal", intended to include diagonals with a variety of widths). Hereby, connections between the nearest frequencies are favorized, and the computationally cost is reduced. In case of a deep network, all frequency channels may still influence each other, even though each layer only has connections to nearby frequency channels.

Figure 5:
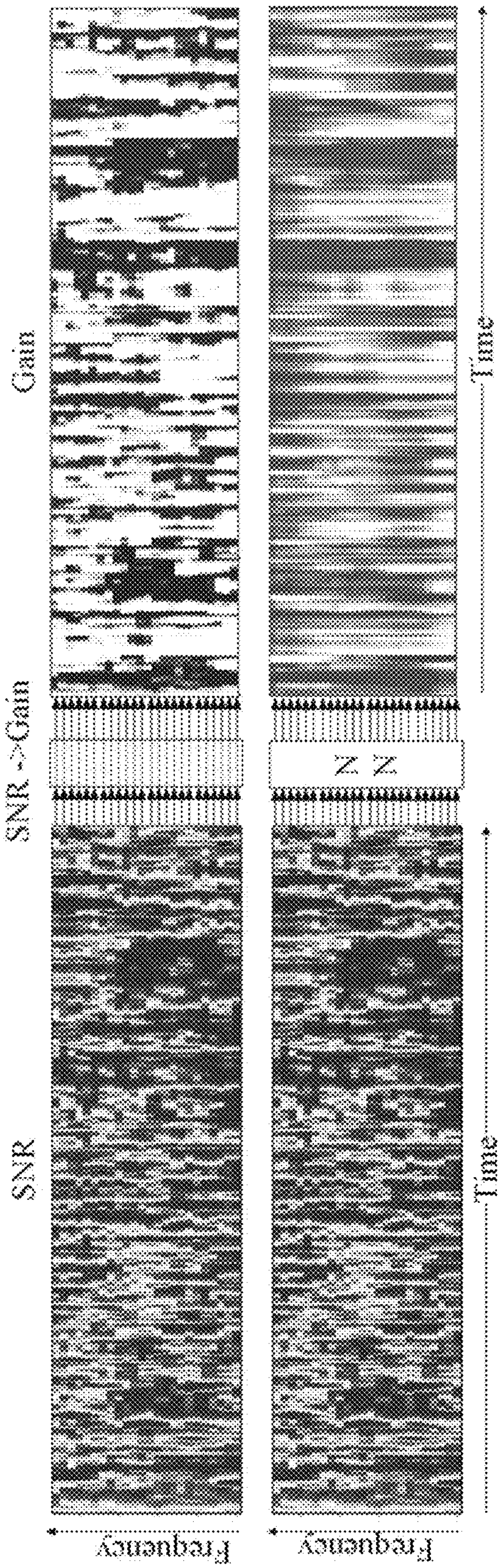
FIG. 5 shows a comparison between mapping SNR-to-gain using separate mapping in each separate frequency channels and applying a joint gain map for all frequency, e.g. based on a neural network.

FIG. 5 shows a comparison between mapping SNR-to-gain using separate mapping in each separate frequency channels and applying a joint gain map for all frequency, e.g. based on a neural network. The left part of FIG. 5 illustrates SNR(k,m) where k is frequency (vertical axis denoted 'Frequency') and m is time (horizontal axis denoted 'Time'). The right part of FIG. 5 illustrates corresponding Gain(k,m) resulting from an SNR-to-gain transformation. FIG. 5 illustrates the difference between a local mapping from SNR-to-gain wherein SNR estimates from neighboring frequencies are not taken into consideration (G(k)=f(SNR(k)), cf. top part of the drawing) and a gain mapping wherein the gain is estimated based on SNR estimates from all frequency channels (G(k)=f(SNR(1), . . . , SNR(K)), cf. bottom part of the drawing). In the gain maps (right part of FIG. 5), white areas indicate that the corresponding time-frequency units should be attenuated, while grey/black areas indicate that corresponding time-frequency units should be kept unaltered. It can be seen that the calculated gains are more correlated across frequency, when across-frequency information has been taken into account (cf. vertical 'line pattern' in the lower right map).

Figure 6:
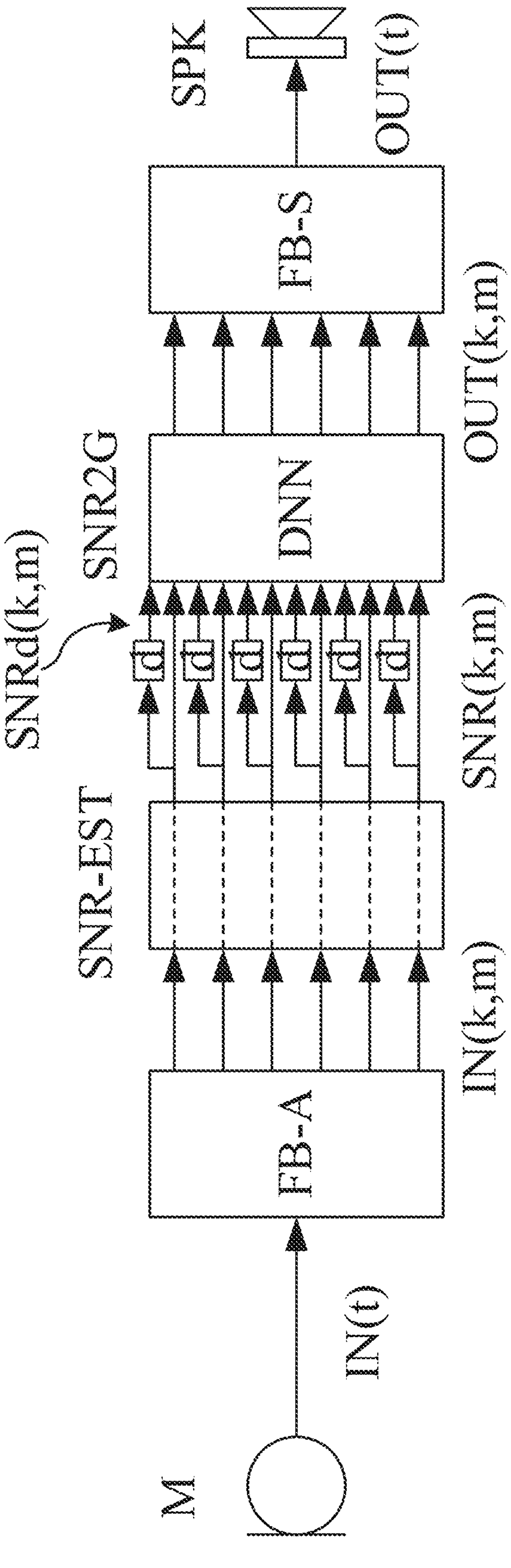
FIG. 6 shows an embodiment of a hearing device according to the present disclosure, wherein an input to the neural network not only consists of the current SNR estimate, but also of SNR estimates obtained from previous time frames.

The above illustrated examples show a neural network which only takes the currently estimated SNR as input. In addition, previous SNR estimates may be used as input to the neural network. By using a recurrent network structure, the neural network is as well able to utilize information from SNR estimates of previous time frames. This is illustrated in FIG. 6. FIG. 6 shows an embodiment of a hearing device according to the present disclosure, wherein an input to the neural network not only consists of the current SNR estimate, but also of SNR estimates obtained from previous time frames. The previous time frames may e.g. be the most recent time frame, it may be the two most recent time frames. The previous time frames may be down-sampled, e.g. consisting of every second previous time frame or every third previous time frame or an even higher stride.

In hearing instruments such as hearing aids, the latency through the hearing instrument is typically below 10 milliseconds. Due to this limitation, the frequency resolution of the filter bank is limited.

One of the advantages of utilizing a neural network structure for mapping estimated signal-to-noise ratios to a gain function is that it allows a mapping from estimated signal-to-noise ratios obtained at frequency channels, which are different from the frequency channels to which the gain is applied. We may thus obtain SNR estimates from a filter bank which has a frequency resolution, which is higher than the frequency resolution typically allowed in a hearing aid. Alternatively, the gain estimate may be based on an SNR estimate, where the frequency resolution of the SNR estimates is lower than the frequency resolution of the desired gain. Hereby it is easier to take e.g. the harmonic structure of speech signals into account. The neural network will thus be optimized in order to find the best possible mapping from an n-channel SNR estimate (or another input) to a k-channel gain. This is exemplified in FIG. 7.

Figure 7:
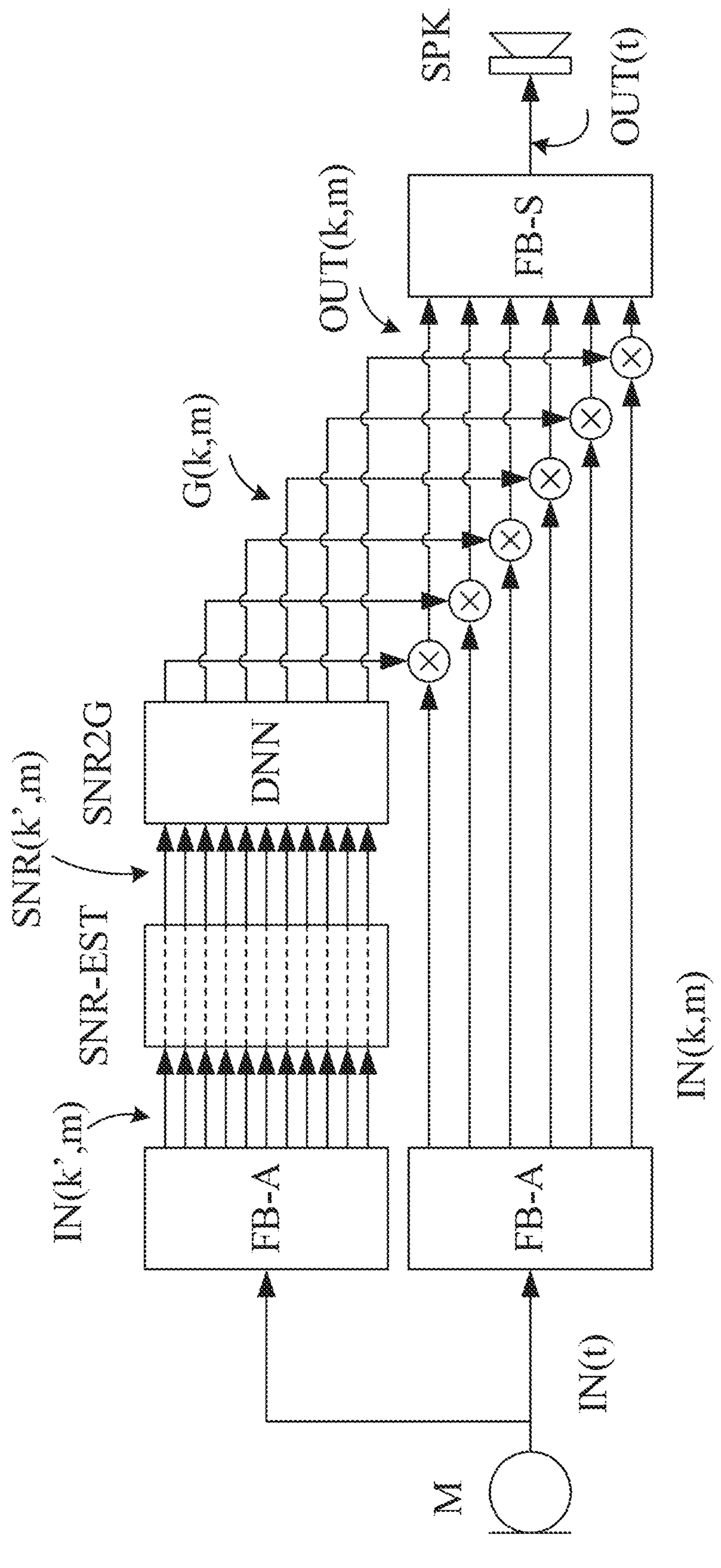
FIG. 7 shows a neural network optimized in order to find a mapping from an n-channel SNR estimate to a k-channel gain vector.

FIG. 7 shows a neural network optimized in order to find a mapping from an n-channel SNR estimate to a k-channel gain vector.

Figure 8:
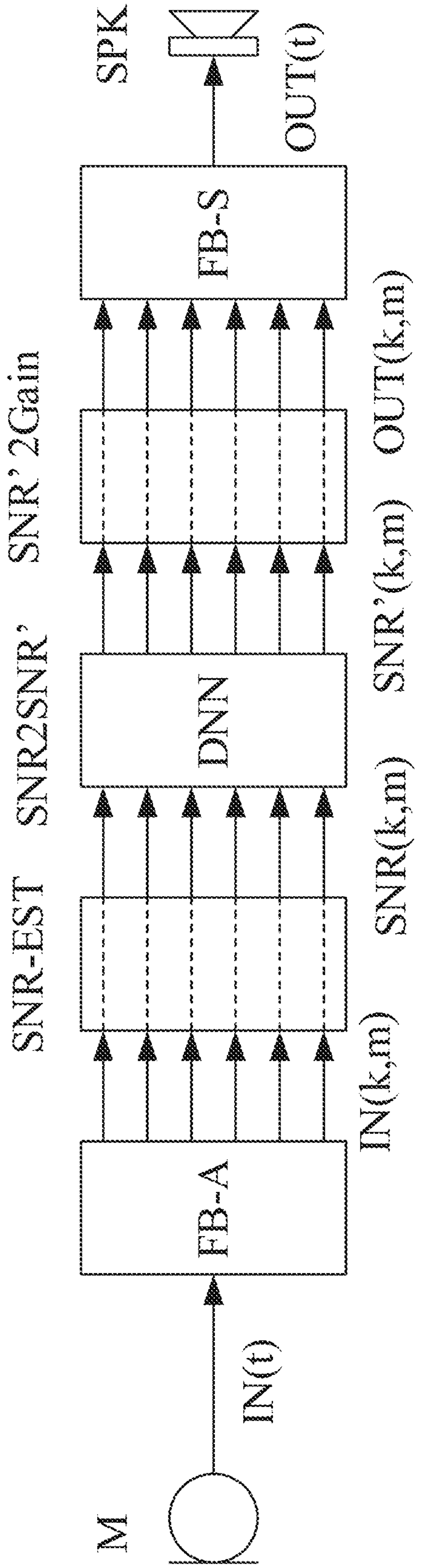
FIG. 8 shows an alternative to mapping the SNR estimates to a gain vector, wherein the neural network is optimized towards improving the current SNR estimate.

As an alternative to mapping the SNR estimates to a gain vector, a neural network could be applied in order to improve the estimated SNR, as shown in FIG. 8. In that case, the cost function is optimized towards minimizing a distance between the improved SNR, SNR', and an ideal SNR, (available in the training data).

FIG. 8 shows an alternative to mapping the SNR estimates to a gain vector, wherein the neural network is optimized towards improving the current SNR estimate.

The method may also find use in cochlear implants, where the audio signal is not necessarily synthesized back into a time-domain audio signal. Instead, the different frequency channels are converted into electrode stimuli signals. In this case, a neural network may be an advantageous method to find the optimal way of mapping SNR (or gain) estimates to a set of electrode stimuli signals. This is exemplified in FIG. 9.

Figure 9:
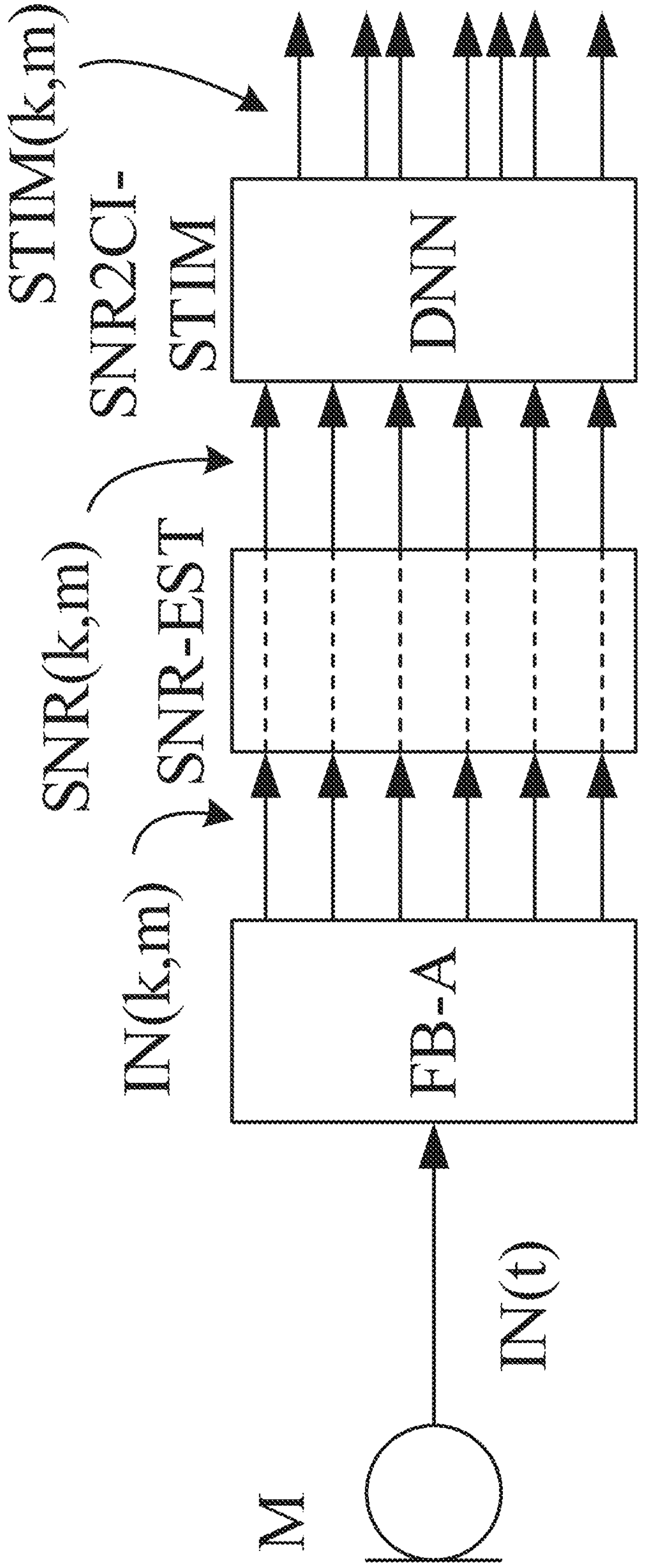
FIG. 9 illustrates the proposed concept applied to cochlear implant-type hearing devices, wherein the SNR estimate (and possibly other gain contributions) is mapped to electrode stimuli.

FIG. 9 illustrates the proposed concept applied to cochlear implant-type hearing devices, wherein the SNR estimate (and possibly other gain contributions) is mapped to electrode stimuli. The network may be trained individually depending on the individual electrode placements. The non-uniform distribution of output channels indicate that the individual placement of electrodes may vary between individuals or some electrodes for an individual may be inactive.

Figure 10:
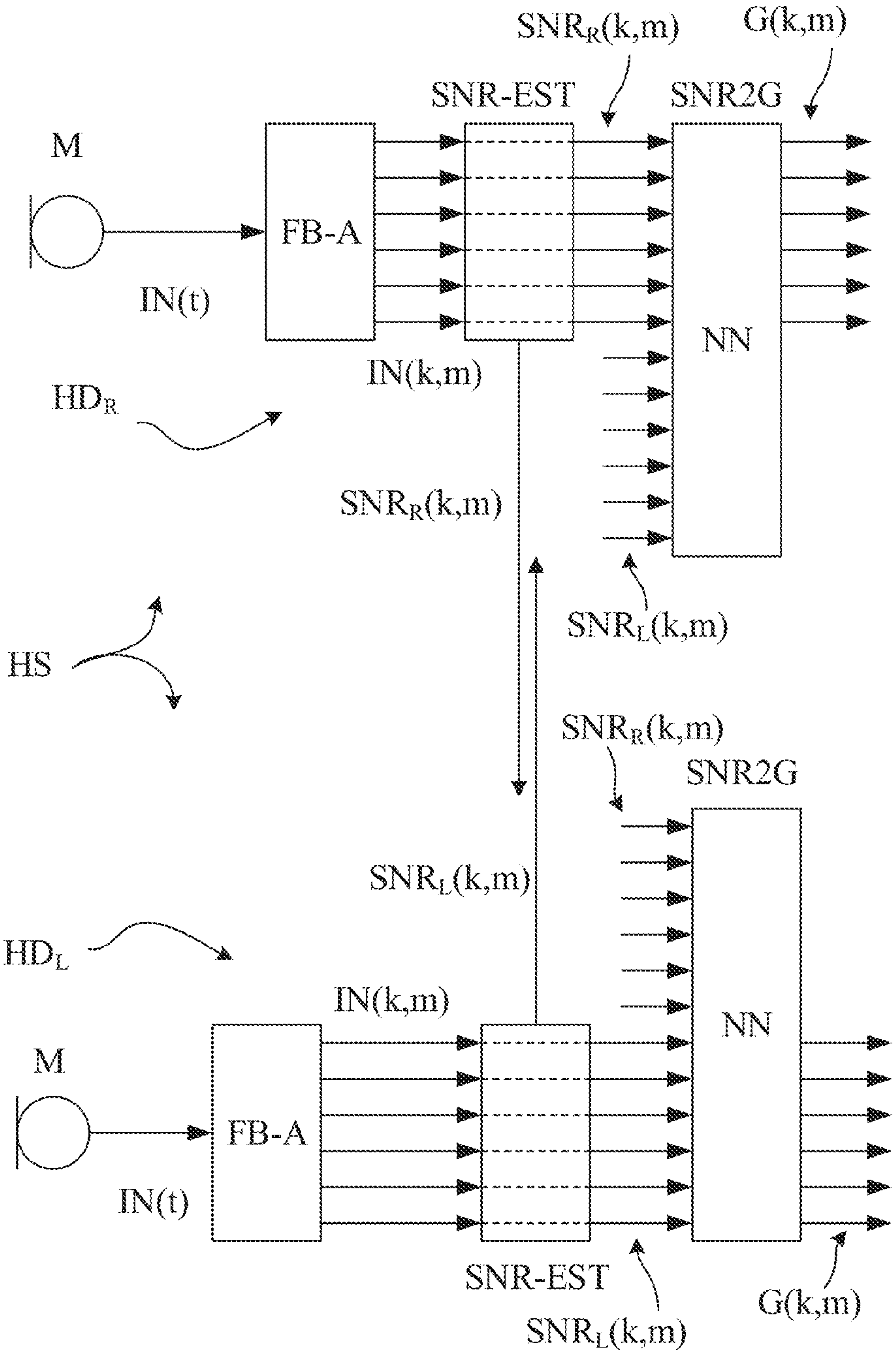
FIG. 10 illustrates how the SNR-to-gain map may be expanded to a binaural hearing system, wherein not only local SNR estimates are used as input for the neural network.

FIG. 10 illustrates how the SNR-to-gain map may be expanded to a binaural hearing system, wherein not only local SNR estimates are used as input for the neural network. In the case of a binaural hearing instrument system, the locally estimated signal-to-noise ratios may be exchanged between the instruments and utilized for the gain estimation at the other hearing instrument. Hereby both local and external snr estimates will be available for the neural network. The exchanged snr estimates utilized at the other instrument may be a subset of the local snr estimates, e.g. a down-sampled stir estimate or a time delayed SNR estimate or an SNR estimate limited to a subset of the frequency channels.

Figure 11:
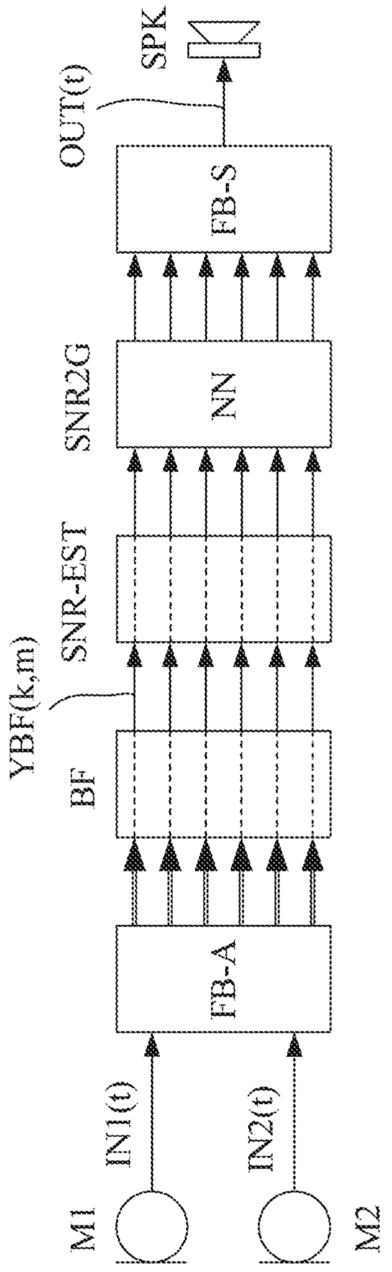
FIG. 11 shows a hearing device according to the present disclosure comprising a beamformer for spatially filtering the electric input signals from a multitude of microphones and where the beamformed signal is used as input to the noise reduction system.

FIG. 11 shows a hearing device according to the present disclosure comprising a beamformer (BF) for spatially filtering the electric input signals (IN1(t), IN2(t)) from a multitude of microphones (M1, M2) and where the beamformed signal (YBF(k,m)) is used as input to the noise reduction system. Apart from the additional multi-microphone and beamformer arrangement (instead of the single microphone), the embodiment of FIG. 11 is similar to the embodiment of FIG. 3. The multi-microphone-beamformer (BF) may however, be present in any of the embodiments shown in the present disclosure, such as FIG. 2, 3, 6, 7, 8, 9, 10, 12, 13A, 13B, 14, 15, 16A, 16B, 16C.

Figure 12:
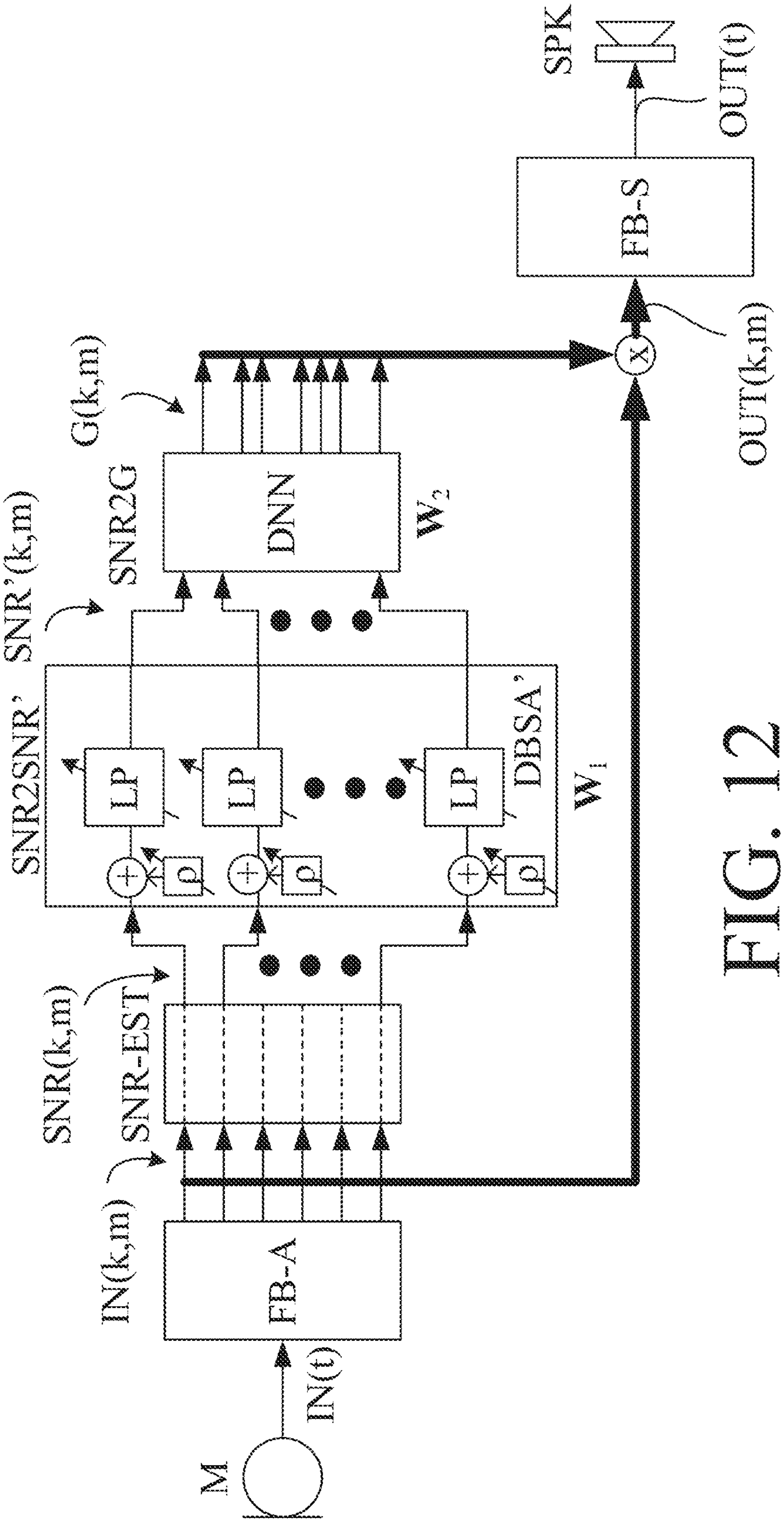
FIG. 12 shows an embodiment of a hearing device according to the present disclosure comprising first and second SNR estimators, and where the second estimator is based on a trained Directed Bias and Smoothing Algorithm (DBSA')

FIG. 12 shows an embodiment of a hearing device according to the present disclosure comprising first and second. SNR estimators, and where the second estimator is based on a trained Directed Bias and Smoothing Algorithm ('DBSA'). The hearing device comprises a microphone (M) providing an electric input signal in the time domain IN(t) (t representing time) representative of sound in the environment of the hearing device. The hearing device further comprises an analysis filter bank (FB-A) for converting the time domain signal to a frequency domain signal comprising number K of frequency sub-band signals (IN(k,m)), where k (=1, . . . , K) and m are frequency and time indices, respectively). The microphone (M) or the analysis filter bank (FB-A) may comprise appropriate analogue to digital converter circuitry to provide an analogue electric input signal as digitized samples. The hearing device further comprises a (first) signal-to-noise ratio estimator (SNR-EST) for providing a (first) SNR-estimate SNR(k,m) of each frequency sub-band signal (IN(k,m)). The through-going dashed lines in the (first) signal-to-noise ratio estimator (SNR-EST) indicates that the SNR estimates of a given 'channel' k is independent of the other channels (as also indicated in FIGS. 1, 2, 3, 6, 7, 8, 9, 10, 11, and 13A, 13B, 14, 15, 16A, 16B, 16C), i.e. e.g. NOT implemented by a neural network. The first signal-to-noise ratio estimator (SNR-EST) may however also be based on a neural network. The hearing device further comprises a (second) signal-to-noise ratio estimator (SNR2SNR'), which converts the SNR provided by the first signal-to-noise ratio estimator (SNR-EST) to an (improved) second signal-to-noise ratio SNR'(k,m), which is then used by SNR-to-gain converter SNR2G to provide appropriate (noise reduction) gains G(k,m) for each frequency sub-band to be applied to the input signal(s) (IN(k,m)). The (second) signal-to-noise ratio estimator (SNR2SNR') in the embodiment of FIG. 12 is based on a trained Directed Bias and Smoothing Algorithm ('DBSA'). Directed Bias and Smoothing Algorithm (DBSA) is described in US20170345439A1 (co-invented by some of the present inventors), where a non-linear smoothing of a first signal to noise SNR ratio provides the second signal-to-noise ratio SNR'. The estimation of the second SNR for a given frequency channel is implemented by low-pass filtering of the first signal-to-noise ratio (cf. also units LP in FIG. 12), wherein the time constant or cut-off frequency of the individual low-pass filters are adaptively determined. The non-linear smoothing is based on adaptively determined (SNR-dependent) bias (cf. units ρ) and said time constants or cut-off frequencies for each frequency sub-band k. The adaptivity is indicated in FIG. 12 by the arrows through the bias units ρ and the low-pass filters LP. In the disclosure of US20170345439A1, the second signal-to-noise ratio SNR' is determined from the first signal-to-noise ration SNR by a recursive algorithm and the mentioned adaptively determined bias and smoothing parameters. In the embodiment of FIG. 12, bias and time constant/cut-off frequency parameters are determined by supervised learning, e.g. using iterative, steepest-descent or steepest ascent methods, e.g. implemented by a neural network. The (optimized) bias and smoothing parameters (indicated by matrix of weights $W_1$ in FIG. 2) and the (optimized) weights $W_2$ of the neural network of the SNR-to-gain unit (SNR2G) may be determined from training data comprising first signal-to-noise ratios SNR(k,m) for a (e.g. large) number of noisy test signals and corresponding (known) clean signals and an appropriate cost function, using the SNR-to-gain unit (and the combination unit 'x') to provide the noise reduced signals OUT(k,m) (=G(k,m)IN(k, m)) in FIG. 12. The noise reduced signal OUT(k,m)—possibly further processed by applying appropriate other algorithms to the noise reduced signal (e.g. level-compression to apply a frequency and level dependent gain (or attenuation) to the noise reduced signal). Such further processing is not shown in the embodiments of the present disclosure, but may of course be inserted before (or after) the synthesis filter bank providing a time-domain output signal OUT(t) from the frequency sub-band signals OUT(k,m). The output signal OUT(t) is fed to an output transducer, here a loudspeaker (SPK), for presenting a resulting signal to a user as stimuli perceivable by the user as sound.

In the embodiments of the present disclosure the output unit is illustrated as a loudspeaker, it may, however, comprise a vibrator of a bone-conduction type hearing device or a multi-electrode array of a cochlear implant type hearing device, or a combination thereof.

The embodiments of FIG. 1, 2, 3, 6, 8, 9, 11, 13A, 14, 15 are shown as one signal path or forward path carrying out all processing of the input signal(s). It may however be implemented in other ways, e.g. with an analysis path and a forward (signal) path as e.g. illustrated in FIGS. 7, 12 and 13B, where a noise reduction gain (e.g. attenuation) is determined in the analysis path and applied to the input signal(s) by a combination unit ('x') in the forward path.

Figure 13A:
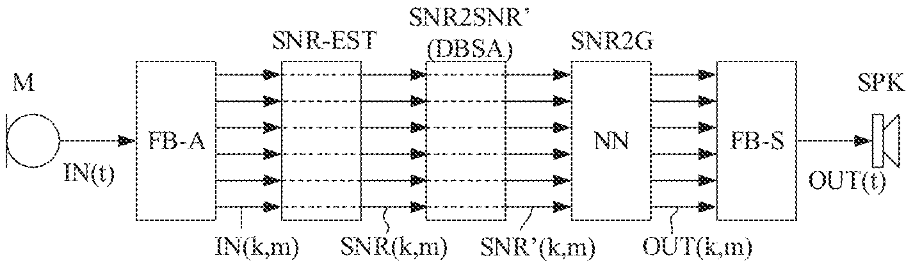
FIG. 13A shows an embodiment of a hearing device according to the present disclosure comprising first and second SNR estimators, and where the second estimator is based on a Directed Bias and Smoothing Algorithm (DBSA) as described in US20170345439A1, and wherein the SNR-to-gain converter is based on a neural network.

FIG. 13A shows an embodiment of a hearing device according to the present disclosure comprising first and second SNR estimators, and where the second estimator is based on a Directed Bias and Smoothing Algorithm (DBSA) as described in US20170345439A1, and wherein the SNR-to-gain converter (SNR2G) is based on a neural network. Otherwise the embodiment of FIG. 13A resembles the embodiment of FIG. 12.

Figure 13B:
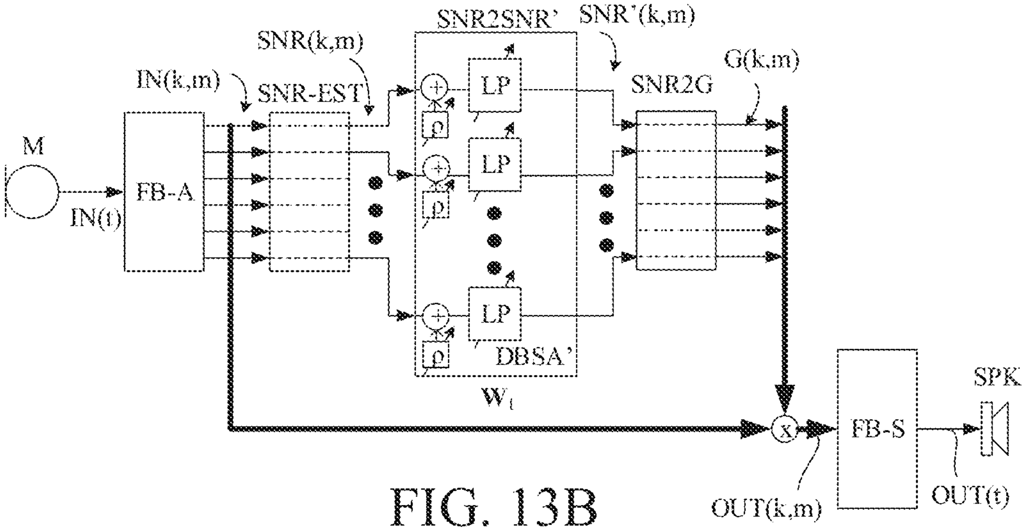
FIG. 13B shows an embodiment of a hearing device according to the present disclosure comprising first and second SNR estimators, and where the second estimator is based on a trained Directed Bias and Smoothing Algorithm (DBSA'), and wherein the SNR-to-gain converter is based on a conventional algorithm.

FIG. 13B shows an embodiment of a hearing device according to the present disclosure comprising first and second SNR estimators (SNR-EST and SNR2SNR', respectively), and where the second estimator is based on a trained Directed Bias and Smoothing Algorithm (DBSA'), as described in connection with FIG. 12, and wherein the SNR-to-gain converter is based on a conventional algorithm (e.g. on a Wiener gain function, or other appropriate scheme).

Figure 14:
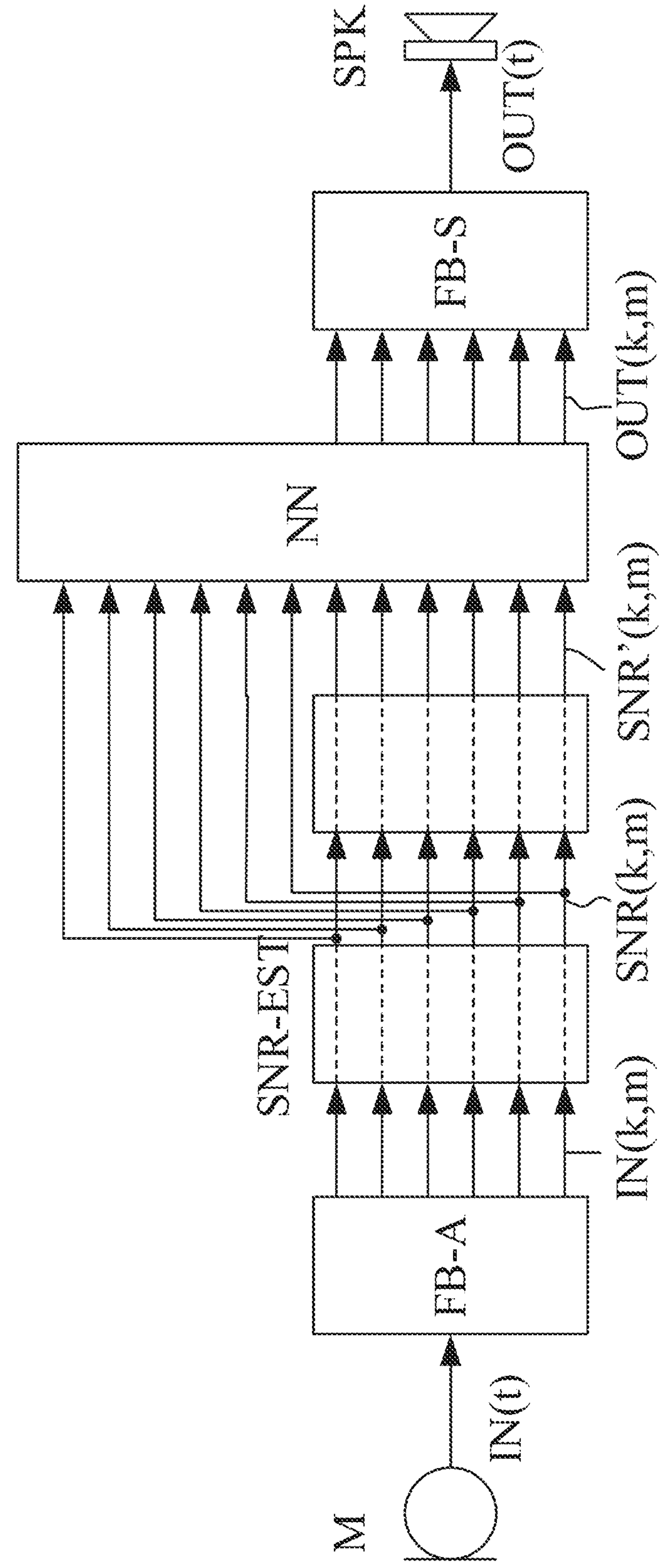
FIG. 14 shows an embodiment of a hearing device according to the present disclosure comprising first and second SNR estimators.

FIG. 14 shows an embodiment of a hearing device according to the present disclosure comprising first and second SNR estimators (SNR-EST and SNR2SNR', respectively). The embodiment of FIG. 14 is similar to the embodiment of FIG. 13A, but in the embodiment of FIG. 14, the outputs of the first and second. SNR estimators (SNR(k,m) and SNR'(k,m), respectively) are applied in parallel as inputs to a neural network (NN) for implementing the SNR-to-gain converter (SNR2G) (whereas in FIG. 13A only the second SNR estimators SNR' are used as inputs to the neural network of the SNR-to-gain converter (SNR2G)). The parameters of the second SNR (SNR') may be (e.g. adaptively) smoothed versions of the first SNR. The smoothing parameters of the SNR' estimation may as well be regarded as part of the neural network (as described in FIG. 13B). SNR2SNR' refers to the block below the text providing the second SNR-estimate (signals SNR'(k,m)).

Figure 15:
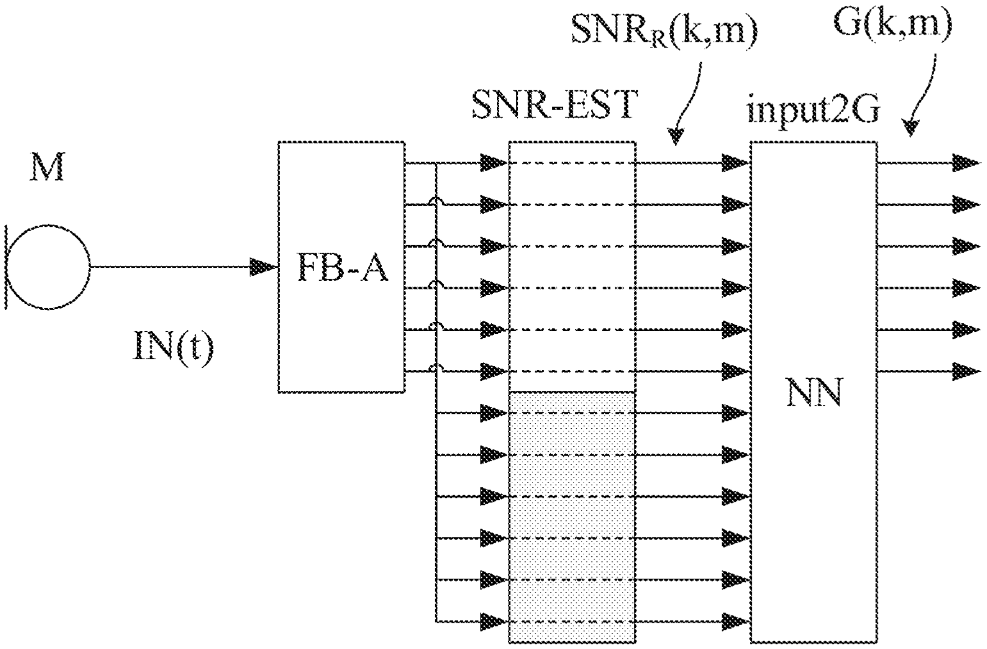
FIG. 15 shows an exemplary SNR estimation comprising a multimodal input and an SNR-to-gain mapping comprising a neural network to provide resulting gains as output.

FIG. 15 shows an exemplary SNR estimation (SNR-EST) comprising a multimodal input and providing resulting estimated SNR-values $SNR_R$(k,m), and an SNR-to-gain mapping (input2G) comprising a neural network (NN) tip provide resulting gains G(k,m as output, k and m being frequency and time indices, respectively. FIG. 15 illustrates and input section of a hearing device according to the present disclosure. The input section further comprises an input transducer (her microphone M) providing (time domain) electric input signal IN(t) and an analysis filter bank (FB-A) providing the electric input signal as respective frequency sub-band signals IN(k,m). The extra input could be another feature derived from the input signal (IN). The feature may be a vector containing values across frequency, the feature may be a scalar such as e.g. an own voice flag. The feature may be another signal-to-noise ratio estimate based on other features. The feature may originate from another device, e.g. another hearing device or a smart phone. In that case the feature does not origin from the (local) input signal (IN). The figure exemplifies that the neural network (NN) may have multimodal input for the SNR estimation. In addition to the SNR, additional input may improve the network output even further. Such additional input signal could be one or more of

- a (single or multichannel) voice activity flag,
- (single or multichannel) own voice activity flag,
- a different SNR estimate. SNR estimates may (e.g. be based on signal modulation (based on at least one microphone signal) or spatial properties (utilizing at least two microphone signals, or binaural SNR estimates (as mentioned in connection with FIG. 10)),
- an onset flag (e.g. provided by an onset or transient detector, e.g. derived directly from the time domain signal),
- estimated Direction of Arrival (DoA) information,
- a camera based input e.g. capturing lip-reading or throat movement information.

Figure 18:
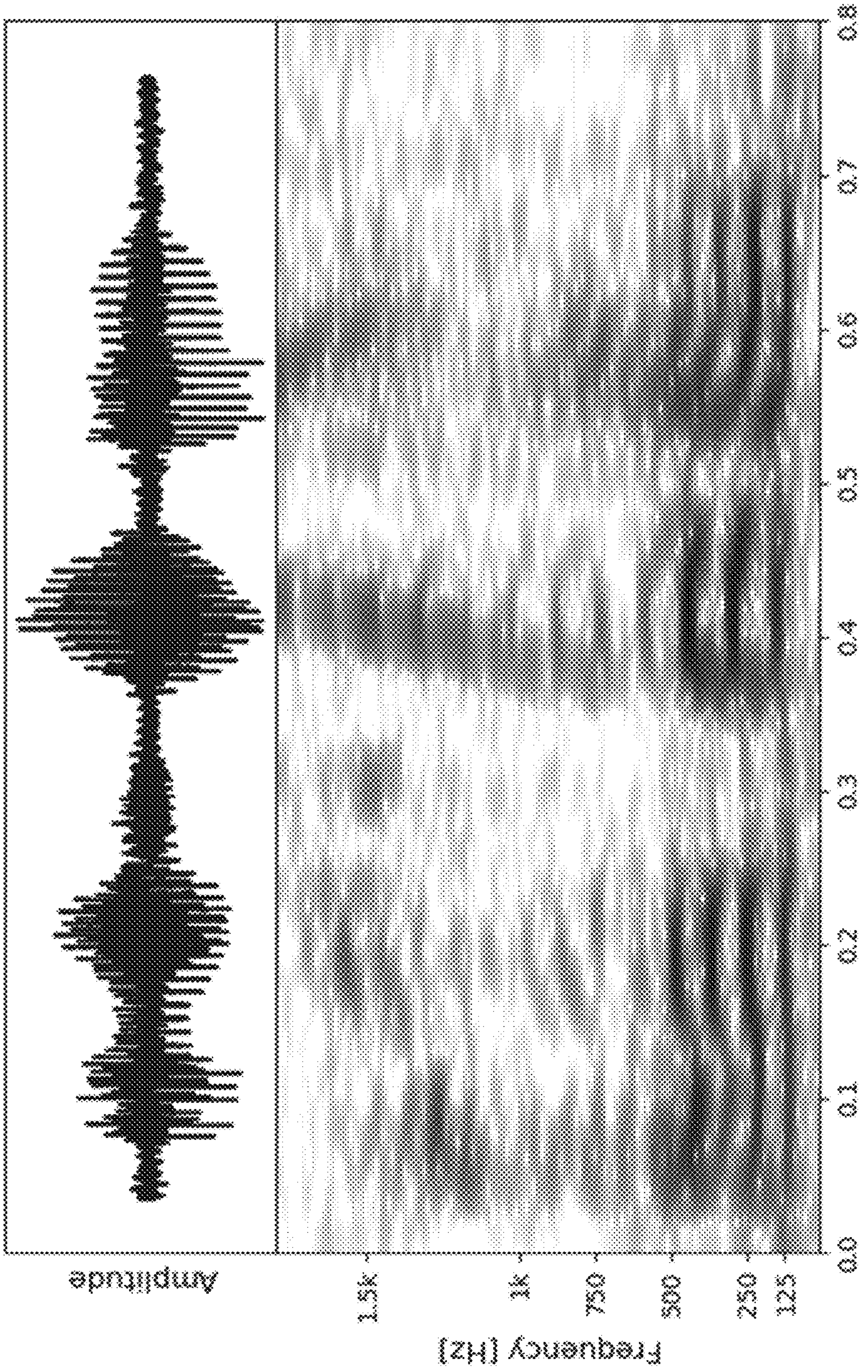
FIG. 18 shows a waveform (upper part) and a corresponding spectrogram of the waveform (lower part) of a signal spoken with a fundamental frequency around 125 Hz.

Related to the disclosure in connection with FIG. 18, below: The additional inputs to the SNR-estimator (e.g. implemented as a neural network) or directly to the neural network (input2G) may e.g. include phase information of the electric (frequency sub-band) input signals from the analysis filter-bank The phase information may e.g. include phase changes over time, e.g. on a per frequency band basis. Such 'd(phase)/dt'-information is representative of frequency content in a given band, e.g. at which frequencies the 'content' of the frequency band is located. Thereby relatively broad frequency bands can be implemented (beneficial to keep latency of the fitter bank low) while still being able (e.g. using a neural network) to focus noise attenuation on frequency ranges within a frequency sub-band. The outputs of the neural network (input2SNR) may be (as normally) real valued gains G(k,m) or complex valued gains G(k,m) (or separate real valued gains and real valued phases).

The multimodal input may as well be a combination of the above-mentioned input signals.

In an aspect of the present disclosure, a hearing device is configured to provide that a maximum amount of noise reduction may depend on the type of noise. As the artefacts (e.g. resulting from noise reduction) may be different depending on the noise type, the maximum amount of attenuation may depend on the type of background noise, such as depending on the amount of modulation. If, for example, the background noise is modulated, a higher amount of attenuation may be tolerated compared to an unmodulated background.

Figure 16A:
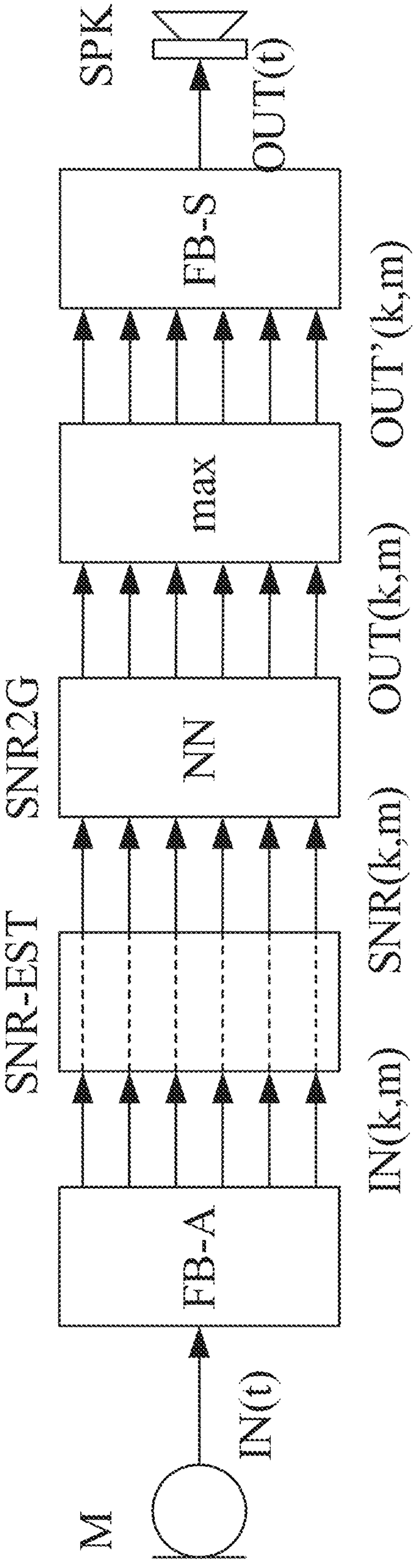
FIG. 16A shows an embodiment of a hearing device comprising a noise reduction system with fixed maximum attenuation according to the present disclosure.
Figure 16B:
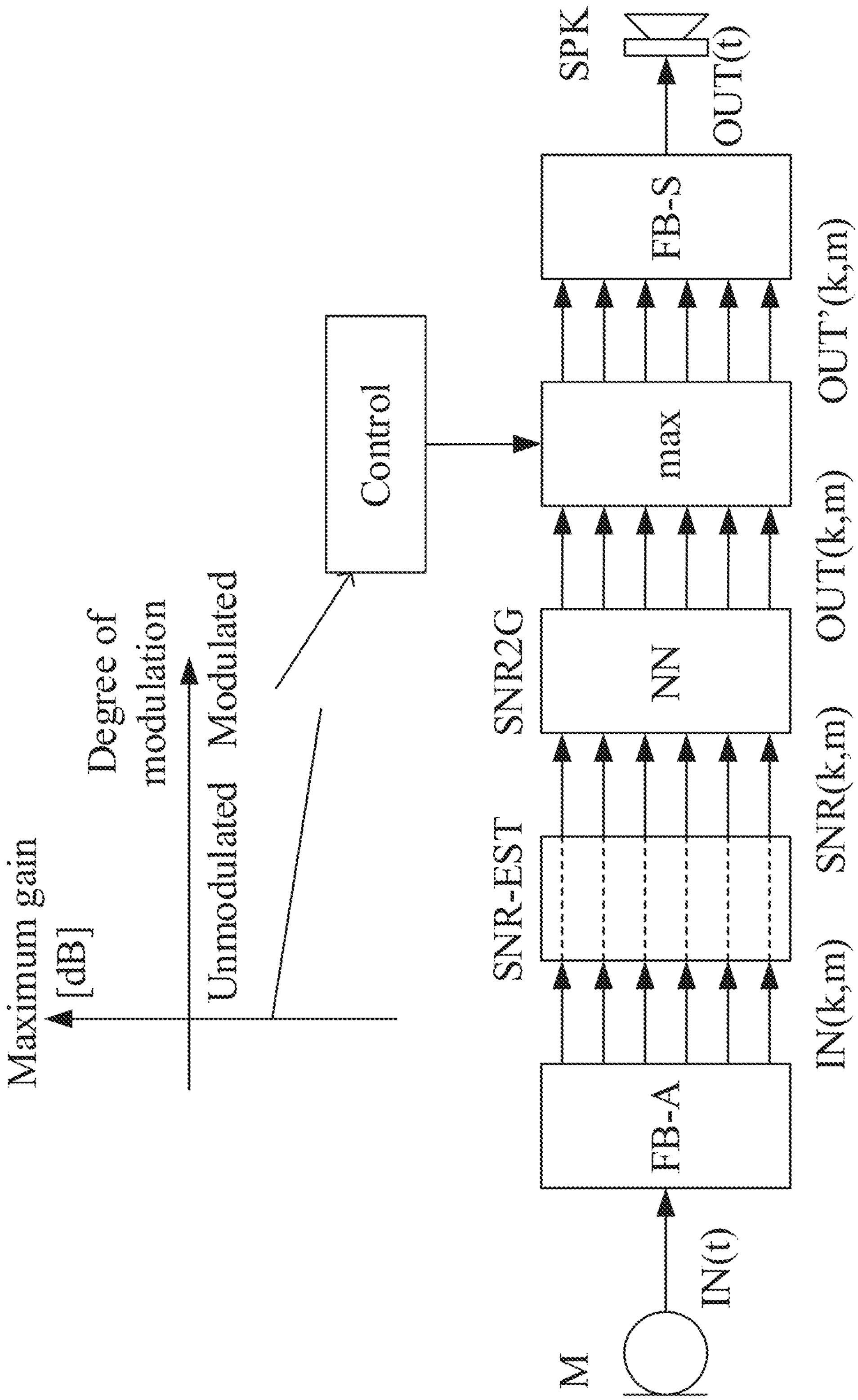
FIG. 16B shows an embodiment of a hearing device comprising a noise reduction system with adaptively determined maximum attenuation in dependence of input signal modulation according to the present disclosure.
Figure 16C:
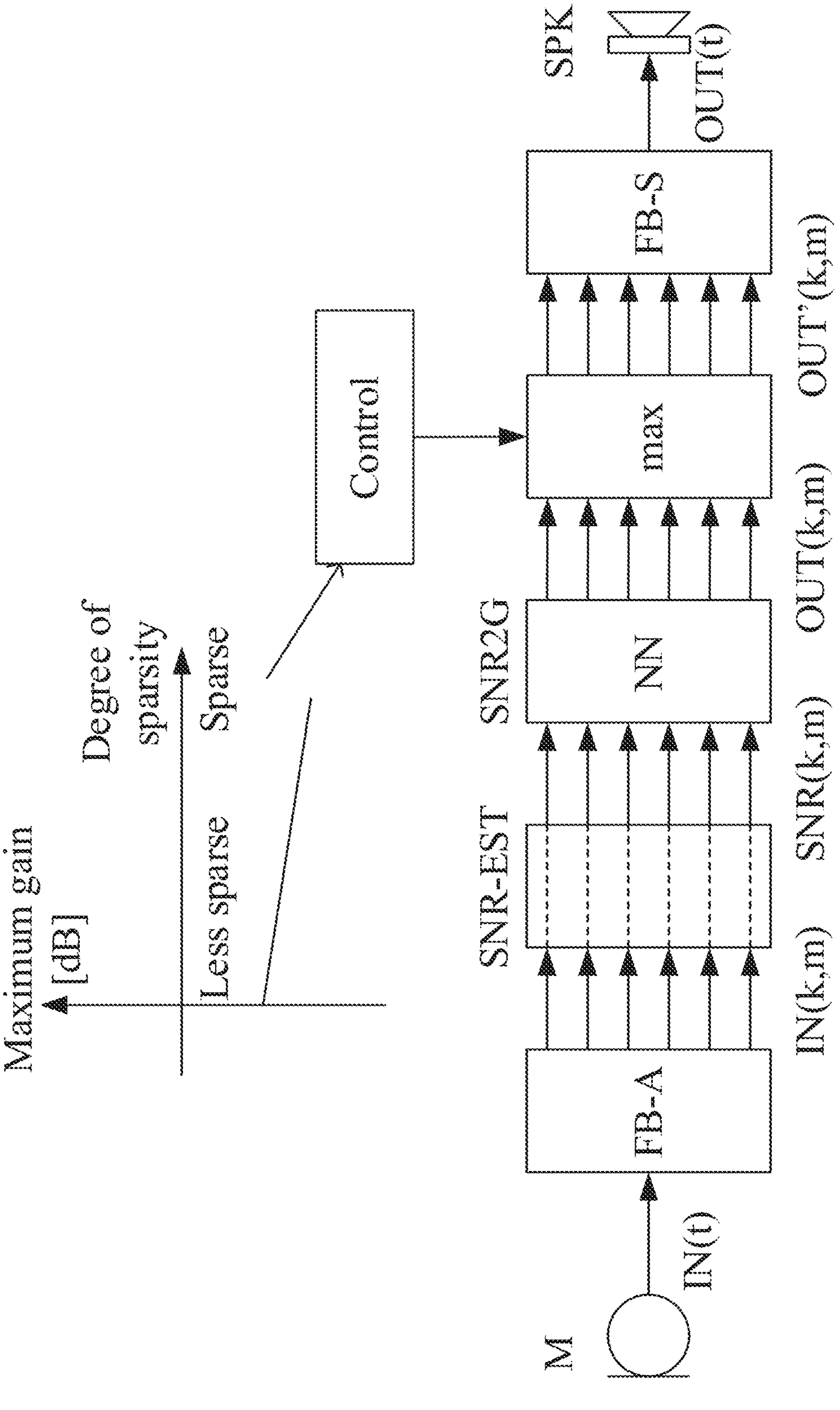
FIG. 16C shows an embodiment of a hearing device comprising a noise reduction system with adaptively determined maximum attenuation in dependence of overlap sparsity of noise and speech of the input signal according to the present disclosure, FIG. 17 schematically illustrates a training setup for a neural network of an SNR-to-gain estimator according to the present disclosure.

FIG. 16A, 16B, 16C shows different embodiments of a hearing device comprising a noise reduction system according to the present disclosure. The embodiments of a hearing device resemble the embodiment of FIG. 3, but comprising an extra block (max) in the forward paths for controlling the maximum attenuation of the noise reduction. The embodiments of FIG. 16A, 16B, 16C may be implemented as described in connection with FIG. 3 or using an analysis path determining appropriate (frequency dependent) gains (attenuation) and a forward path wherein these gains are applied to the electric input (frequency sub-band) signal, as e.g. illustrated in FIG. 7 (or FIG. 12, or 13B). The three embodiments differ in the determination of a maximum attenuation of the noise reduction system (cf. block max in FIG. 16A, 16B, 16C). The three embodiments exhibit fixed maximum attenuation (FIG. 16A), and adaptively determined maximum attenuation (FIG. 16B, 16C), respectively. The embodiments may comprise further functional units (e.g. processing units) than illustrated in FIG. 16A, 16B, 16C. FIG. 16A shows a hearing device (or a part thereof) according to an embodiment of the present disclosure. The gain derived from the network may be limited to a certain amount of attenuation. E.g. the system is not allowed to attenuate more than e.g. 5 dB or 10 dB or 15 dB or 20 dB, depending on the application. The maximum attenuation may be a fixed value. The maximum attenuation may be frequency dependent (but fixed for each frequency band). This is illustrated in FIG. 16A.

In general, while training the network, the maximum attenuation may as well be reflected in the training data. Rather than aiming for a clean target signal, the objective may be a noisy target signal, where the noise has been attenuated by a certain amount, e.g. 10 dB. The amount of attenuation in the noisy target signal may depend on the noise type.

Alternatively, the maximum attenuation may be adjusted using supervised learning, e.g. by 1.5 training a neural network with different noise types labeled by a maximum attenuation.

The maximum attenuation may e.g. be adaptively determined, e.g. from the input level, a signal-to-noise ratio, or the sound environment.

Some noise types may be better suited for a fast-varying gain than other noise types. E.g. a sparse background noise which has a small overlap in time and frequency with the desired speech signal can be attenuated more (without introducing artifacts) than a background noise which has a high degree of overlap with the desired speech signal.

The overlap between speech and noise can be estimated by measuring the amount of modulation of the background signal (e.g. using a target cancelling beamformer as noise estimate). This is illustrated in FIG. 16B, which is similar to FIG. 16A, but where the maximum attenuation of a stationary (unmodulated) noise source can be attenuated less than the maximum attenuation allowed for a more modulated background (such as e.g. multi-talker babble). The latter is illustrated by the top graph schematically showing maximum gain [dB] (vertical axis) versus degree of modulation (horizontal axis), The straight line indicates an increasing maximum attenuation (decreasing gain) with increasing degree of modulation (e.g. modulation index). The location of the horizontal axis may indicate the location of 0 dB on the vertical axis. The arrow from the graph determining the maximum attenuation value indicates the (possibly frequency dependent) attenuation value fed to control unit (Control) for applying the resulting gain value to the electric signals of the forward path. The Control block may determine the maximum attenuation based on different input features. (e.g. not only modulation).

Alternatively, the sparsity of the background noise may be estimated, e.g. in terms of the 'Gini index of speech' (or similar) (see e.g. [Rickard & Fallon; 2004]). This is illustrated in FIG. 16C, which is similar to FIG. 16B, but where the top graph indicates an increasing maximum attenuation (decreasing gain) with increasing degree of sparsity (e.g. overlap in time and/or frequency of background noise with (target) speech).

Other properties/features of the noise may as well be used to determine the maximum attenuation, e.g. detection of tonal components, music or pitch or acoustic features such as the amount of diffuseness of the noise field.

Figure 17:
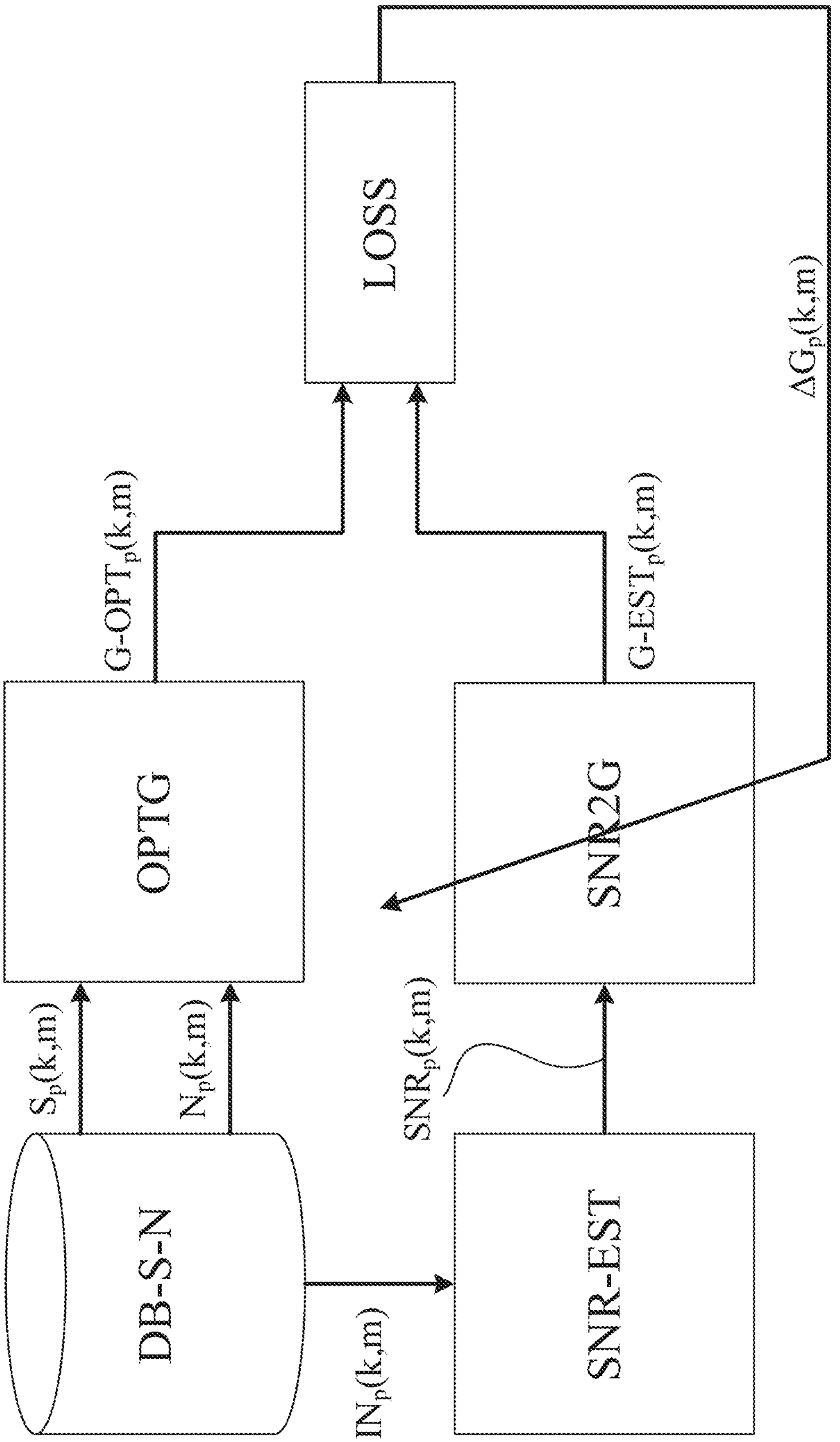

FIG. 17 schematically illustrates a training setup for a neural network of an SNR-to-gain estimator according to the present disclosure. FIG. 17 shows a database (DB-S-N) comprising appropriate examples (index p, p=1, . . . , P) of time segments of clean speech S, each time segment being e.g. larger than 1 s, e.g. in the range from 1 s to 20 s. The database may comprises each time segment in a time frequency representation S(k,m), where k is the frequency index and m is the time index. The database may comprise corresponding examples of noise N (e.g. different types of noise and/or different amounts (level) of noise) for the $p^{th}$ speech segment, e.g. in a time frequency representation N(k,m). The different corresponding time segments of clean speech $S_p$(k,m) and noise $N_p$(k,m) may be presented separately (in parallel) to the block (OPTG) for providing an optimal gain G-OPT$_p$(k,m) for the given combination $S_p$(k, m), $N_p$(k,m) of speech and noise. Likewise, the different corresponding time segments of clean speech $S_p$(k,m) and noise $N_p$(k,m) may be mixed and the mixed signal $IN_p$(k,m) may be presented to the SNR-estimator (SNR-EST) for providing an estimated SNR SNR-EST$_p$(k,m) for the noisy (mixed) input signal $IN_p$(k,m) for the given combination $S_p$(k,m), $N_p$(k,m) of speech and noise. The estimated SNR SNR-EST$_p$(k,m) is fed to SNR-to-gain estimator (SNR2G) implemented as a neural network, e.g. a recurrent neural network, which provides a corresponding estimated gain G-EST$_p$(k,m). The respective optimal and estimated gains (G-OPT$_p$(k,m), G-EST$_p$(k,m)) are fed to a cost function block (LOSS), which provides a measure of the current 'cost' ('error estimate'). This 'cost' or 'error estimate' is iteratively fed back to the neural network block (SNR2G) to modify the neural network parameters until an acceptable error estimate is achieved.

The neural network may be randomly initialized and may thereafter be updated iteratively. The optimized neural network parameters (e.g. a weights, and a bias-value for each node) for the may be found using standard, iterative stochastic gradient, e.g. steepest-descent or steepest-ascent methods, e.g. implemented using back-propagation minimizing a cost function, e.g. the mean-squared error, (cf. signal $\Delta G_p$(k,m)) in dependence of the neural network output G-EST$_p$(k,m) and the optimal gain G-OPT$_p$(k,m). The cost function (e.g. the mean-squared error) is computed across many training pairs (p=1, . . . , P, where P may be ≥10, e.g. ≥50, e.g. ≥100 or more) of the input signals.

The optimized neural network parameters may be stored in the SNR-to-gain estimator (SNR2G) implemented in the hearing device and used to determine frequency dependent gain from frequency dependent input SNR-values, e.g. from an 'a posteriori SNR' (simple SNR, e.g. (S+N)/<N>), or from an 'a priori SNR' (improved SNR, e.g. <S>/<N>), or from both (where <●> denotes estimate).

Other training methods may be used, see e.g. [Sun et al.; 2017].

Noise Reduction Using Phase Information

Hearing devices in general require low latency signal processing. This puts a limit on the minimum width of frequency bands which can be implemented in the filter bank (narrower bands lead to higher latency). A hearing aid with a 20 kHz sampling rate using a 128 band FFT in the filter bank, has a spacing of 20 kHz/1.28=156.25 Hz between the band centers. On top of that, a significant overlap between the frequency bands is implemented. Conversely, a 512 point FFT is used to analyze a signal at 16 kHz leading to a band spacing of 31.25 Hz, with no or small overlap. Human speech has a fundamental frequency of ~80-450 Hz (see spectrogram of speech with fundamental frequency of ~125 Hz in FIG. 18 (lower part). Note the visible harmonic bands with this spacing. The upper part of FIG. 18 shows a time segment of the waveform of the signal (amplitude vs. time [s]) that is provided as a time-frequency map (spectrogram, frequency [Hz] vs, time [s]) in the lower part of FIG. 18. Having a filter bank resolution significantly smaller than the fundamental frequency allows one to remove noise between the harmonic bands of speech while the speaker is active. This is very effective and it is surprisingly easy for a neural network to learn how to do it. However, it comes at a cost of not being able to maintain a very low latency.

One reason why postfilters as typically used today cannot arbitrarily improve the signal is that they only apply a (real) gain/attenuation to the noisy signal (in the frequency domain). Therefore, they can only remove noise to the extent that this can be done without altering the phase of the signal. This constraint has nothing to do with the 'difficulty' of estimating the correct thing to do; it is just as severe for ideal gains computed based on knowledge of target speech and noise in separation. It is partly because of this that noise reduction performance is determined by filter bank resolution. E.g. with a good resolution (many bands) a simple real attenuation can remove the noise between harmonic components of speech, but with a lower resolution (fewer bands) each band spans one or more harmonic components. In the latter case, the information about the noisy gap between speech harmonics is buried in the phase which the (current) noise reduction system cannot modify. It would hence be advantageous to provide a noise reduction algorithm that is able to control phase as well as magnitude.

A solution is proposed: By allowing the noise reduction system to also modify the phase of the noisy signal, it can theoretically control the output signal completely. This can also be seen as allowing the noise reduction system to apply a complex gain instead of a real gain. For instance, if the target speech and the noise is known separately, it is trivial to construct an ideal complex gain which completely restores the clean speech (i.e. achieves infinite SNR improvement). The noise reduction performance of such a system is thus completely determined by the ability to approximate such a gain accurately, and not by the filter bank setup used.

This idea in its basic form agrees with the existing figures in the application. E.g. if we look at FIG. 7, and assume that the outputs of the neural network-based SNR-to-gain unit (SNR2G, DNN), gains G(k,m), are complex numbers. In practice, we might also want to extract some phase information from the analysis filter bank (FB-A) and forward the phase information to the DNN. The DNN may e.g. be configured to provide as an output the complex gain G(k,m). The DNN may be configured to output one gain, e.g. in dB or as a linear gain value, for each channel (magnitude), and one separate phase term in radians (or degrees). These two can then be converted to a complex gain. Other ways to configure such a system may be chosen, but the main idea is that 1) the DNN is (in addition to SNR-information) provided with information about the noisy signal phase in its input and 2) the DNN is allowed to produce an output that affects not just the magnitude of the output signal, but also the phase (the resulting (complex) signals being forwarded to the synthesis filter bank (FB-S) in FIG. 7). This may e.g. be implemented as indicated in FIG. 15.

Instead of phase information PH(k,m) directly, changes over time, ΔPH(k,m)/Δm, e.g. PH(k,m)-PH(k,m−1), of the frequency sub-band phase information may be fed to the SNR-estimator (or directly to the SNR2-to-gain converter (the neural network). Such change over time phase information is representative of the location of frequency content in a given frequency band and may be used by the neural network to locate where in a given frequency sub-band energy is located. Thereby the neural network may allow to process noise components with a larger resolution than the width of the frequency sub-band would normally allow (using only magnitude information as inputs). Thereby a relatively low latency of the filter bank (based on a relatively large bandwidth of the frequency sub-bands) can be implemented without compromising the noise reduction (still allowing an acceptable frequency resolution in noise reduction).

Figure 19A:
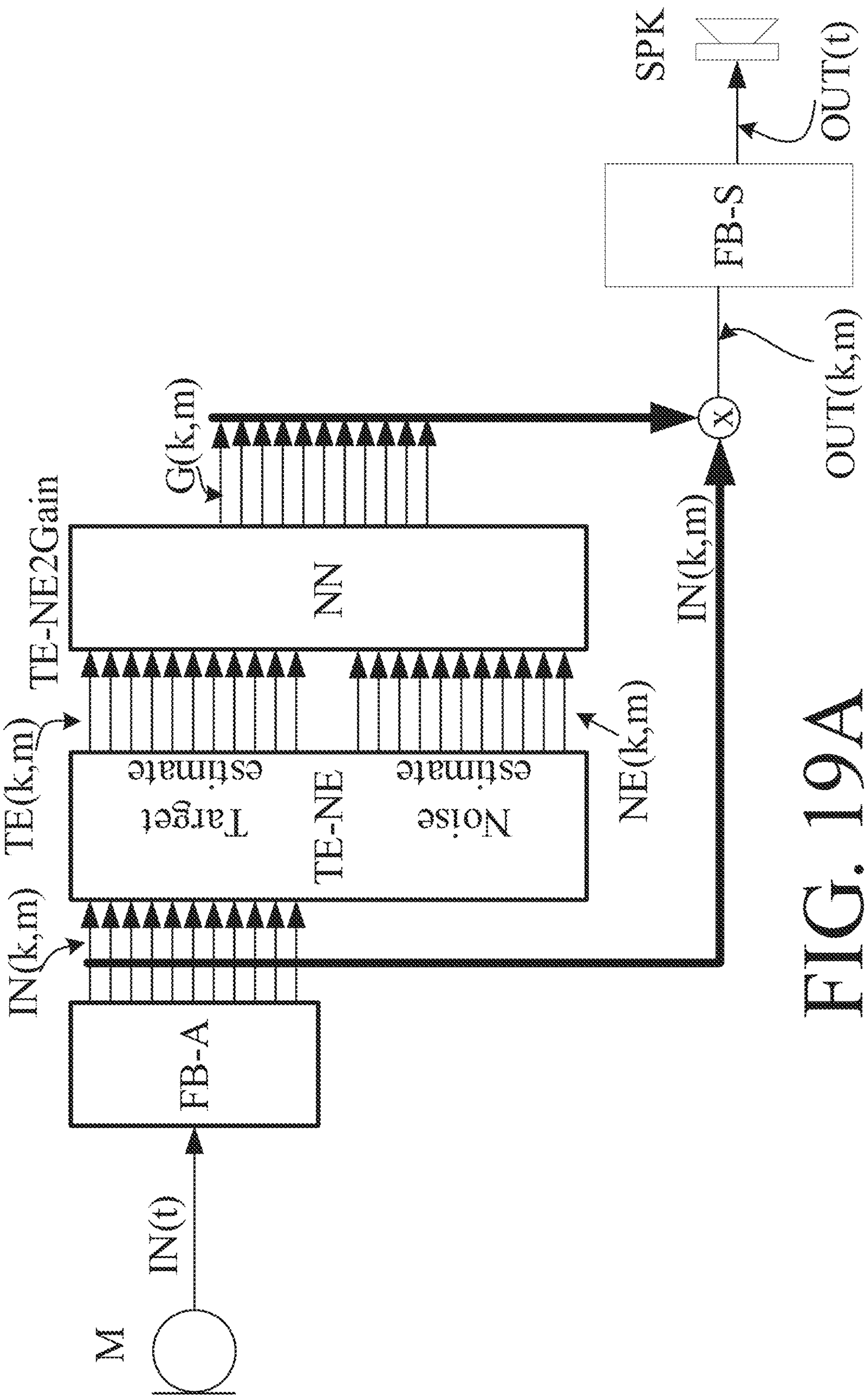
FIG. 19A shows an embodiment of a hearing device according to the present disclosure wherein the input to the neural network instead of being an SNR comprises separate target and noise estimates or the corresponding magnitude responses of target and noise estimates, or at least a noise estimate or a noise estimate and the noisy input mixture.

FIG. 19A shows an embodiment of a hearing device according to the present disclosure wherein the input to the neural network (NN), implementing a noise reduction gain estimator (TE-NE2Gain), instead of being an SNR (as e.g. in FIG. 1-3, 6-16) comprises separate target (FE) and noise (NE) estimates, or the corresponding magnitude responses of target and noise estimates, or at least a noise estimate or a noise estimate and the noisy input mixture. In the embodiment of FIG. 19A, the target estimate (TE) and noise estimate (NE) are estimates based on the signal (IN(t)) from a single input microphone (M). The microphone (M) provides an electric input signal (IN(t), t representing time) in the time domain (e.g. digitized by an analogue to digital converter, as appropriate). The hearing device comprises a filter bank (comprising an analysis filter bank (FB-A) and a synthesis filter bank (FB-S)) allowing processing in the hearing device to be conducted in the time-frequency domain (k,m), where k and in are frequency and time indices, respectively. The analysis filter bank (FB-A) is connected to the microphone (M) and provides the electric input signal IN(t) in a time-frequency representation IN(k, m). The hearing device comprises an output transducer, here a loudspeaker (SPK), for converting an output signal (OUT (t)) in the time-domain to stimuli perceivable by the user as sound. The synthesis filter bank (FB-S)) converts a processed signal in the time-frequency domain (OUT(k,m)) to the output signal (OUT(t)) in the time-domain. The hearing device comprises a target and noise estimator (TE-NE) for providing respective estimates of target (TE(k,m)) and noise (NE(k,m)) components of the electric input signal (IN(k, m)). The target (TE(k,m)) and noise (NE(k,m)) estimates are inputs to the gain estimator (TE-NE2Gain), implemented by a neural network (NN), e.g. a recurrent or a convolutional neural network, e.g. a deep neural network. The output of the neural network (NN) are gain values (G(k,m)) representative of attenuations for implementing noise reduction when applied to a signal of the forward path, here to the electric input signal (IN(k,m)). The gains (G(k,m)) are applied to the electric input signal (IN(k,m)) in a combination unit (here a multiplication unit (X)). The output of the combination unit (X) is the processed output signal (OUT(k,m)), which is fed to the synthesis filter bank (FB-S) for conversion to the time-domain and presentation to the user (and/or transmission to another device or system, e.g. for further processing).

The estimated gain may be applied to the target estimate (TE(k,m)) instead of to the output of the analysis filter bank (electric input signal, IN(k,m)). This is especially relevant in the case where the target estimate is a beamformed signal. Instead of applying the 'noise reduction gains (G(k,m)) from the neural network (NN) to the electric input signal (IN(k, m)), it may be applied to a further processed version of the electric input signal, as e.g. described in the following.

Figure 19B:
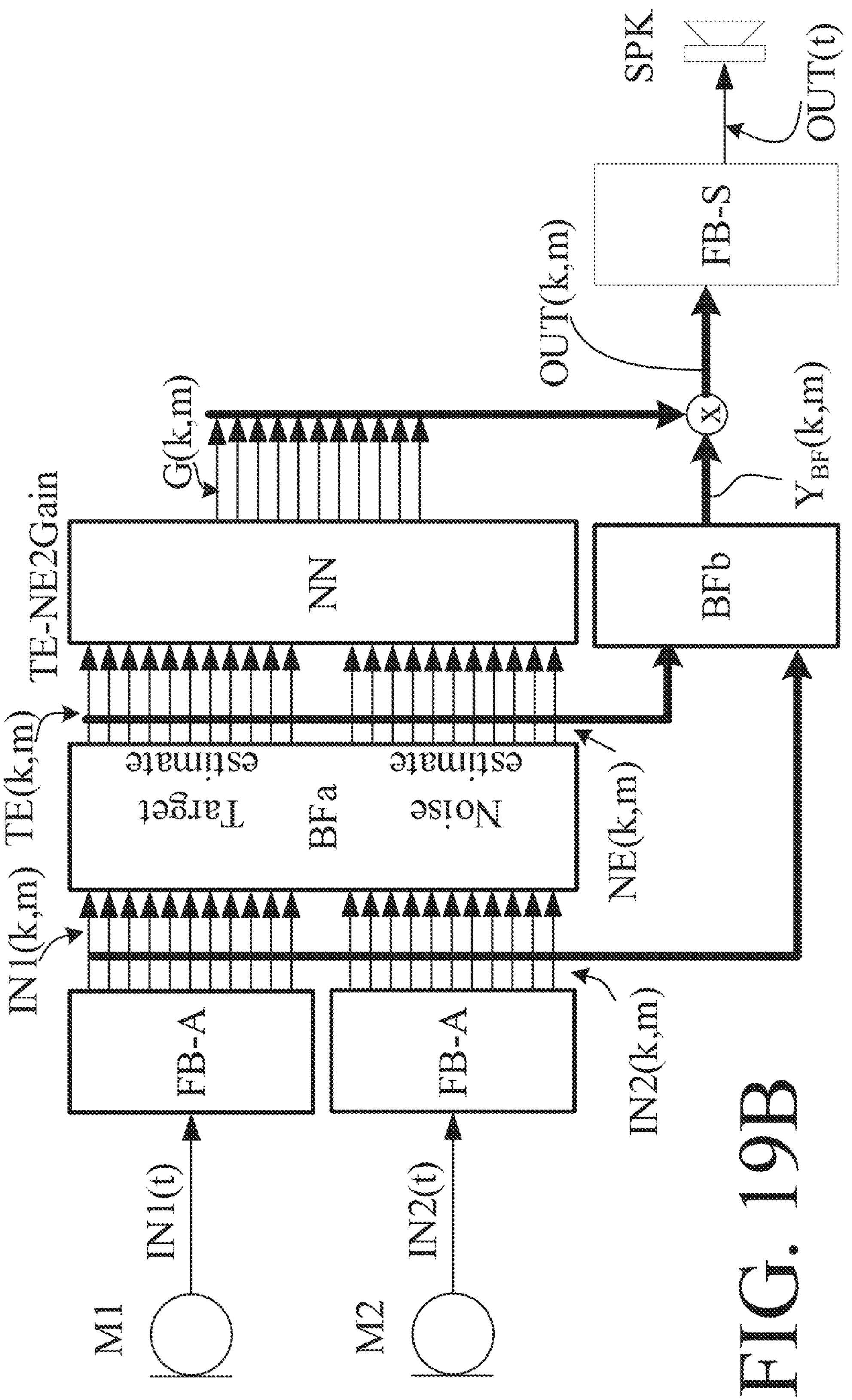
FIG. 19B shows an embodiment of a hearing device according to the present disclosure wherein the input to the neural network the outputs of a target maintaining beamformer (representing a target estimate), and a target cancelling beamformer (representing a noise estimate).

In the case of multiple microphones (e.g. M1, M2 in FIG. 19B), target (TE) and noise (NE) estimates may be obtained from a beamformer filter (BFa) providing linear combinations of the microphone signals (IN1, IN2), e.g. in terms of a target-enhancing beamformer and a target cancelling beamformer (the latter having a null direction pointing approximately towards the target). FIG. 19B shows an embodiment of a hearing device according to the present disclosure wherein the input to the neural network (NN) are the outputs (TE(k,m), NE(k,m)) of a target maintaining beamformer (representing a target estimate, TE(k,m)), and a target cancelling beamformer (representing a noise estimate, NE(k,m)).

The hearing device of FIG. 19B comprises two microphones (M1, M2) each providing an electric input signal (IN1(t), IN2(t)) in the time domain. The hearing device comprises two analysis filter banks (FB-A) connected to respective microphones for providing the electric input signals (IN1(t), IN2(t)) in a time-frequency representation (IN1(k,m), IN2(k,m)). The electric input signals (IN1(k,m), IN2(k,m)) are fed to a beamformer filter (BFa) comprising respective target maintaining and target cancelling beamformers. The target maintaining and target cancelling beamformers provides the target estimate (TE) and the noise estimate (NE) respectively. s in the embodiment of FIG. 19A, the target estimate (TE) and the noise estimate (NE) are used as inputs to the neural network (NN) implementing the noise reduction gain estimator (TE-NE2Gain). The noise reduction gain estimator (TE-NE2Gain) provides gain values (G(k,m)) representative of attenuations for implementing noise reduction when applied to a signal of the forward path, here to a beamformed signal ($Y_{BF}$(k,m)). The beamformed signal ($Y_{BF}$(k,m)) is provided by the beamformer filter (BFb), e.g. as TE-βNE, where β is an adaptively determined parameter (determined in block BFb), cf. e.g. US2017347206A1. The beamformed signal is determined in dependence of the target maintaining and target cancelling beamformers, and the current electric input signals (IN1(k, m), IN2(k,m)) (and possibly a voice activity detector for differentiating between speech and noise).

The beamformers may be fixed or adaptive. Multiple target cancelling beamformers may be used as input features to the neural network (NN) simultaneously. E.g. two target cancelling beamformers, each having a single null direction, but having nulls pointing towards different possible targets.

The magnitudes, or the squared magnitudes, or the logarithm of the magnitudes of the target and the noise estimates may be used as input to the neural network (NN). The outputs of the neural network (NN) may comprise real or complex valued gains, or separate real valued gains and real valued phases.

The maximum amount of noise reduction provided by the neural network may be controlled by level, or modulation (e.g. SNR), or a degree of sparsity of the inputs to the neural network. A degree of sparsity may e.g. be represented by a degree of overlap in time and/or frequency of background noise with (target) speech.

In the embodiment of FIG. 19B, a noise estimate based on a single target cancelling beamformer is shown. Several noise estimates may, however, be provided as input features to the neural network. The different noise estimates may consist of different target cancelling beamformers, each having a null pointing towards a specific direction. But a noise estimate may also be based on other properties than spatial properties, such as a noise floor estimator e.g. based on the modulation of the input signal.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

REFERENCES

US20170345439A1 (Oticon) 30 Nov. 2017

[Rickard & Fallon; 2004], Rickard, S & Fallon, M 2004, The Gini index of speech. in Proceedings of the 38th Conference on information Science and Systems (CISS'04).

[Sun et al.; 2017] Lei Sun, Jun Du, Li-Rong Dai, Chin-Hui Lee, Multiple-target deep learning for LSTM-RNN based speech enhancement, IEEE Hands-free Speech Communication and Microphone Arrays, HSCMA 2017, pp. 136-140

The invention claimed is:

1. A hearing aid configured to be worn by a user at or in an ear or to be fully or partially implanted in the head at an ear of the user, the hearing aid comprising an input unit for providing at least one electric input signal in a time frequency representation k, m, where k and m are frequency and time indices, respectively, and k represents a frequency channel, the at least one electric input signal being representative of sound and comprising target signal components and noise components; and a signal processor comprising an SNR estimator for providing a target signal-to-noise ratio (SNR) estimate for said at least one electric input signal in said time frequency representation;

an SNR-to-gain converter for converting said target signal-to-noise ratio estimates to respective gain values in said time frequency representation, wherein said SNR-to-gain converter comprises a neural network, wherein the weights of the neural network have been trained with a plurality of training signals, and wherein the outputs of the neural network comprise complex valued gains, or separate real valued gains and real valued phases, wherein said time frequency representation of the at least one electric input signal comprises magnitude information as well as phase information, wherein the inputs to said SNR-to-gain converter or to the neural network comprises changes in phase information over time, and wherein said phase changes over time are provided on a per frequency band basis.

2. A hearing aid according to claim 1 comprising a combination unit and wherein said gain values are applied to said at least one electric input signal to provide a processed signal representative of said sound for further processing or presentation to the user as stimuli perceivable as sound.

3. A hearing aid according to claim 1, wherein the inputs to said SNR-to-gain converter comprises magnitude information as well as phase information.

4. A hearing device according to claim 1 wherein said neural network comprises a convolutional neural network or a recurrent neural network.

5. A hearing aid according to claim 1 configured to provide that the inputs to said SNR-to-gain converter comprises changes in phase over time or other features derived from the instantaneous phase across time and frequency.

6. A hearing aid according to claim 1 comprising an analysis filter bank for providing said at least one electric input signal in a time frequency representation.

7. A hearing aid according to claim 6 comprising a synthesis filter bank for converting a processed version of said least one electric input signal from a time frequency representation to a time-domain representation.

8. A hearing aid according to claim 6 wherein the neural network is configured to output one gain for each frequency channel, and one separate phase term in radians.

9. A hearing aid configured to be worn by a user at or in an ear or to be fully or partially implanted in the head at an ear of the user, the hearing aid comprising an input unit for providing at least one electric input signal in a time frequency representation k, m, where k and m are frequency and time indices, respectively, and k represents a frequency channel, the at least one electric input signal being representative of sound and comprising target signal components and noise components; and a signal processor comprising a target signal estimator for providing an estimate of the target signal in said time frequency representation;

a noise estimator for providing an estimate of the noise in said time frequency representation;

a gain estimator for providing respective gain values in said time frequency representation in dependence of said target signal estimate and said noise estimate, wherein said gain estimator comprises a neural network, wherein the weights of the neural network have been trained with a plurality of training signals, and wherein the outputs of the neural network comprise real or complex valued gains, or separate real valued gains and real valued phases, wherein the target and noise estimates are based on a multitude of microphones providing said at least one electric input signal as a multitude of electric input signals, wherein the target and noise estimates are obtained from linear combinations of the multitude of electric input signals, and wherein the target and noise estimates are obtained from a) a target-enhancing beamformer and b) a target cancelling beamformer having a minimum sensitivity direction pointing approximately towards the target source or sources, said beamformers being provided by said linear combinations of said multitude of electric input signals.

10. A hearing aid according to claim 9 wherein the magnitudes, or the squared magnitudes, or the logarithm of the magnitudes of the target and the noise estimates are input to the neural network.

11. A hearing aid according to claim 9 wherein the target and noise estimates are based on a single microphone providing said at least one electric input signal.

12. A hearing aid according to claim 9, wherein the target-enhancing and/or the target cancelling beamformers are fixed or adaptive.

13. A hearing aid according to claim 9, comprising a plurality of target cancelling beamformers simultaneously providing said noise estimate to the input features to the gain estimator, each of said plurality of target cancelling beamformers having a single minimum sensitivity direction pointing towards a different target source.

14. A hearing aid according to claim 9 configured to provide that the maximum amount of noise reduction provided by the neural network is controlled by level, or modulation, or a degree of sparsity of the inputs to the neural network.

15. A hearing aid configured to be worn by a user at or in an ear or to be fully or partially implanted in the head at an ear of the user, the hearing aid comprising an input unit for providing at least one electric input signal in a time frequency representation k, m, where k and m are frequency and time indices, respectively, and k represents a frequency channel, the at least one electric input signal being representative of sound and comprising target signal components and noise components;

a signal processor comprising an SNR estimator for providing a target signal-to-noise ratio (SNR) estimate for said at least one electric input signal in said time frequency representation;

an SNR-to-gain converter for converting said target signal-to-noise ratio estimates to respective gain values in said time frequency representation, wherein said SNR-to-gain converter comprises a neural network, wherein the weights of the neural network have been trained with a plurality of training signals, and wherein the outputs of the neural network comprise complex valued gains, or separate real valued gains and real valued phases;

an analysis filter bank for providing said at least one electric input signal in a time frequency representation; and a synthesis filter bank for converting a processed version of said least one electric input signal from a time frequency representation to a time-domain representation, wherein the outputs of said SNR-to-gain converter comprises gains as well as phase adjustments, or other output features that can be applied to the at least one electric input signal before the synthesis filter bank in such a way as to change either its magnitude, or phase, or both.

16. A hearing aid configured to be worn by a user at or in an ear or to be fully or partially implanted in the head at an ear of the user, the hearing aid comprising an input unit for providing at least one electric input signal in a time frequency representation k, m, where k and m are frequency and time indices, respectively, and k represents a frequency channel, the at least one electric input signal being representative of sound and comprising target signal components and noise components;

a signal processor comprising an SNR estimator for providing a target signal-to-noise ratio (SNR) estimate for said at least one electric input signal in said time frequency representation;

an SNR-to-gain converter for converting said target signal-to-noise ratio estimates to respective gain values in said time frequency representation, wherein said SNR-to-gain converter comprises a neural network, wherein the weights of the neural network have been trained with a plurality of training signals, and wherein the outputs of the neural network comprise complex valued gains, or separate real valued gains and real valued phases; and an analysis filter bank for providing said at least one electric input signal in a time frequency representation, wherein the hearing aid is configured to extract phase information from the analysis filter bank and forward the phase information to the neural network.

* * * * *